(12) United States Patent
Iwamatsu

(10) Patent No.: US 6,504,879 B1
(45) Date of Patent: Jan. 7, 2003

(54) DIGITAL MODULATION APPARATUS

(75) Inventor: Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/275,757

(22) Filed: Mar. 25, 1999

(30) Foreign Application Priority Data

Jul. 17, 1998 (JP) .......................................... 10-204058

(51) Int. Cl.⁷ .............................................. H04L 27/36
(52) U.S. Cl. ........................ 375/298; 375/261; 332/103
(58) Field of Search ................................ 375/298, 261, 375/308, 279; 332/103, 104, 105; 455/108

(56) References Cited

U.S. PATENT DOCUMENTS

| | | | | |
|---|---|---|---|---|
| 4,015,222 A | * | 3/1977 | Werner ........................ | 332/103 |
| 5,121,412 A | * | 6/1992 | Borth ......................... | 375/308 |
| 5,519,732 A | * | 5/1996 | Chester | |
| 5,930,301 A | * | 7/1999 | Chester et al. .............. | 375/296 |
| 6,356,594 B1 | * | 3/2002 | Clement et al. ............ | 375/261 |

FOREIGN PATENT DOCUMENTS

| | | |
|---|---|---|
| JP | 6-205055 | 7/1994 |
| JP | 10-023096 | 1/1998 |

* cited by examiner

Primary Examiner—Phuong Phu
(74) Attorney, Agent, or Firm—Katten, Muchin, Zavis, Rosenman

(57) ABSTRACT

Disclosed is a digital modulation apparatus which comprises a quadrature amplitude modulation unit for modulating first and second baseband digital signals orthogonal to each other by means of digital cosine/sine information obtained based on information regarding a carrier frequency which is n multiple of a local frequency and a phase rotation unit provided in the input side of the quadrature amplitude modulation unit for performing phase rotation for the first and second baseband digital signals by using a difference frequency equivalent to a difference between the local frequency and a a baseband frequency. A frequency is converted into a transmitted frequency without using an analog circuit for conversion into a second frequency, a limit value of this transmitted frequency is increased, and a circuit is fully digitized to simplify and miniaturize a circuit configuration. As a result, the turning of the circuit into LSI can be facilitated, and high accuracy and high cost effectiveness can be promoted.

19 Claims, 18 Drawing Sheets

DIGITAL MODULATION APPARATUS

BACKGROUND OF THE INVENTION (1) Field of the Invention

The present invention relates to a digital modulation apparatus.

(2) Description of the Related Art

In recent years, with the diversification of communication services and the increase of demands for information communications, high-speed, large capacity and long distance digital transmission has been performed in a basic trunk transmission line using an optical fiber or a CATV transmission line. The improved performance of an optical device and the technological achievement of a high speed for an LSI have greatly reduced costs for an optical transmission device.

Considered as one of radio transmission systems for supporting such an optical transmission foundation is trunk type multiplex radio transmission which uses a microwave band. Radio transmission data provides for an overall framework for frequency assignment, and so on. For achieving a much higher speed for radio digital transmission, a multivalued digital transmission system such as a QAM (Quadrature Amplitude Modulation) or a QPSK (Quadri Phase Shift Keying) has been employed to secure a high bit rate even in a narrow frequency band.

Described below as systems for converting baseband signals into signals of transmission frequencies with reference to FIGS. 16 to 19 are four kinds including an analog system of one kind and digital systems of three kinds.

Referring to FIG. 16, shown are main sections of the transmitter of an analog type radio transmitter-receiver. An analog modulation apparatus 50 shown in FIG. 16 up-converts a baseband modulating signal into a signal of an RF (Radio Frequency) band and then transmits this signal to a radio channel. The analog modulation apparatus 50 comprises roll-off filters 51a and 51b for bang-processing baseband signals to reduce intersymbol interference to a minimum, a frequency conversion unit 54 for frequency-converting the outputs of these roll-off filters 51a and 51b into signals of an RF band and a transmission unit 55 for transmitting the RF signals to the radio channel.

Herein, the frequency conversion unit 54 frequency-converts the outputs of the roll-off filters 51a and 51b and then up-converts the same into signals of an RF band. The frequency conversion unit 54 is constructed to include a D/A (Digital/Analog) converter 52a for converting the output of the roll-off filter 51a from digital to analog and thereby obtaining a multivalued baseband signal, a D/A converter 52b for D/A-converting the output of the roll-off filter 51b, a first frequency conversion unit 53a for up-converting the baseband signal outputted from the D/A converter 52a into a signal of an RF frequency, a second frequency conversion unit 53b for up-converting a baseband signal outputted from the D/A converter 52b into a signal of an RF frequency, a 90° phase sifter 53e for inputting the output of a carrier generator 53d to the first frequency conversion unit 53a and an output phase-shifted by 90° to the second frequency conversion unit 53b, and a hybrid unit 53c for coupling the outputs of these first and second frequency conversion units 53a and 53b.

The transmission unit 55 transmits an RF signal outputted from the hybrid unit 53c to the radio channel. The transmission unit 55 is constructed to include a band-pass filter 55a for limiting a transmission band and thereby eliminating unnecessary harmonic components and an antenna 55b for transmission to the radio channel.

In the analog system configured in the above manner, baseband signals are outputted from the roll-off filters 51a and 51b, and then the baseband signals are frequency-converted into signals of an RF band. This analog system is disadvantageous for use in that there is an effect of variance in performance between RF elements and a circuit fine adjustment is necessary. However, with the achievement of a high speed for a device and the improvement of a high-level LSI technology, the analog system is replaced by a digital system, and now it is possible to increase the accuracy of and miniaturize a modem.

Referring to FIG. 17, shown are main sections of the transmitter of a radio transmitter-receiver of a digital modulation system. A digital modulation apparatus 56 shown in FIG. 17 performs quadrature amplitude modulation for an inputted data signal and then transmits the signal to a radio channel. The digital modulation apparatus 56 comprises roll-off filters 51a and 51b, a transmission unit 55 and a quadrature amplitude modulation unit 57.

Herein, the quadrature amplitude modulation unit 57 performs quadrature amplitude modulation for baseband signals outputted respectively from the roll-off filters 51a and 51b. The quadrature amplitude modulation unit 57 is constructed to include a first frequency conversion unit 57a, a second frequency conversion unit 57b, a hybrid unit 57c, a carrier generator 57d, a counter 57e, a cosine information/sine information ROM (Read Only Memory) 57f and a D/A converter 57g.

The counter 57e receives a clock of a speed n×$f_{SYMBOL}$ (Hz) which is outputted from the carrier generator 57d, and then outputs this clock corresponding to phase information. Herein, a code n denotes an integer ≧2 (normally, an integer ≧4), and a code $f_{SYMBOL}$ denotes a symbol clock.

The cosine information/sine information ROM 57f has an index based on addresses outputted from the counter 57e, and outputs amplitude value information regarding digital sine and cosine components. Amplitude value information regarding digital sine and cosine waveforms is outputted according to phase values obtained by subdividing 0 to 2π at proper intervals.

The first frequency conversion unit 57a multiplies an Ich baseband signal outputted from the roll-off filter 51a by a digital cosine component outputted from the cosine information/sine information ROM 57f. The second frequency conversion unit 57b multiplies a Qch baseband signal outputted from the roll-off filter 51b by a digital sine component outputted from the cosine information/sine information ROM 57f. Then, Ich and Qch modulating signals respectively outputted from the first and second frequency conversion units 57a and 57b are coupled together in the hybrid unit 57c, passed through the D/A converter 57g and then outputted from the transmission unit 55.

The roll-off filters 51a and 51b and the transmission unit 55 are the same as the functions of the above analog system, and thus explanation thereof will be omitted.

In the digital system configured in the above manner, quadrature amplitude modulation is performed. In other words, in this digital system, a band for a baseband signal is raised by digital processing. Specifically, its band is raised by multiplying the baseband signal by a sampling clock having a speed faster by n times. More specifically, a baseband signal of a symbol clock speed $f_{SYMBOL}$ outputted from the roll-off filter 51a is multiplied by a digital cosine waveform having a speed faster by n times, and a baseband signal of a symbol clock speed $f_{SYMBOL}$ outputted from the roll-off filter 51b is multiplied by a digital sine waveform having a speed faster by n times.

A carrier frequency of $n \times f_{SYMBOL}$ (Hz) is thereby obtained, and the band is directly up-converted to an RF band.

Here, if there is no problem for the use of an n multiple frequency of a symbol clock as a center frequency of a transmitted carrier, it is possible to configure the transmission system such that a baseband signal can be n multiple of a symbol clock synchronized with this baseband signal. But if there is a problem for the use of an n multiple frequency of a symbol clock, it is necessary to convert a signal outputted from the D/A converter 57g in the quadrature amplitude modulation unit 57 into yet another frequency.

The need of conversion into yet another frequency arises because in terms of a relationship between an outputted transmitted frequency and a symbol clock indicating a processing speed for a baseband signal, the transmitted frequency is not integral multiple of the symbol clock in most cases. In other words, in this method, a frequency obtained by processing a baseband signal at an n multiple speed of the same must coincide with the transmitted frequency. But since a value of the transmitted frequency is one predetermined based on system data, there is no coincidence between this value and the n multiple frequency of the baseband signal.

Furthermore, because of no RF elements which operate in frequency bands other than an existing band or because of no operation guarantees, an RF circuit must be configured by using one of a currently used frequency band.

On the other hand, the frequency conversion unit may obtain a transmission speed by increasing the number of modulation multivalues for a baseband signal and using an analog system. But this method is not so efficient. It is because if the number of modulation multivalues is increased by QAM or the like, the increased number of multivalues will lead to an increase in the number of digital processing bits and thus an increase in the size of a digital circuit. Consequently, cost effectiveness and power consumption will become problems. For solving these problems, it is now desired that a digital circuit should be miniaturized by devising a circuit.

Employed therefore is a method for performing frequency conversion between an outputted frequency requested by a radio system to be operated and a symbol clock frequency. In other words, a symbol clock frequency is converted into a second intermediate frequency by using a second carrier frequency, and then it is converted into a desired transmitted frequency.

An example of conversion into such a second intermediate frequency can be provided by a circuit configuration shown in FIG. 18. Shown in FIG. 18 is an example specified for the case of n=4.

Referring now to FIG. 18, shown are main sections of the transmitter of a digital modulation radio transmitter-receiver using a selector. A digital modulation apparatus 59 shown in FIG. 18 performs quadrature amplitude modulation for inputted data, converts its output into a second intermediate frequency and then converts it into a desired transmitted frequency. The digital modulation apparatus 59 comprises roll-off filters 51a and 51b operated based on symbol clocks, a transmission unit 55, a quadrature amplitude modulation unit 60 and a third frequency conversion unit 61.

Herein, the quadrature amplitude modulation unit 60 selects Ich and Qch signals by the selector and then outputs these signals. The quadrature amplitude modulation unit 60 is constructed to include phase inversion units 60a and 60b, a selector 60c, a carrier generator 60d, a 4-ary counter 60e and a D/A converter 60f.

The third frequency conversion unit 61 converts a signal outputted from the quadrature amplitude modulation unit 60 into a desired transmitted frequency. The third frequency conversion unit 61 is constructed to include a carrier generator 61a and a mixer 61b.

In the digital modulation apparatus 59 configured in the above manner, baseband signals from the roll-off filters 51a and 51b are inputted to the selector 60c together with signals inverted in the phase inversion units 60a and 60b of the quadrature amplitude modulation unit 60. Then, in the selector 60c, outputs are received from the 4-ary counter 60e, the outputs having been provided from the carrier generator 60d at a speed of $4 \times f_{SYMBOL}$ (Hz), and four kinds of signals, i.e., I, Q, −I and −Q, are selected and outputted. Then, in the D/A converter 60f, a signal outputted from the selector 60c is D/A-converted at a speed of $4 \times f_{SYMBOL}$ (Hz). Then, in the third frequency conversion unit 61, the signal is converted into a second carrier and then transmitted from the transmission unit 55.

Thus, a modulating signal is up-converted into a desired frequency by using a second carrier and then transmitted. In addition, as disclosed in Japanese Patent Laid-Open (Kokai) No. HEI 10-023096, there is available a technology for miniaturizing a digital circuit by operating roll-off filters based on symbol clocks, which is realized by circuit devising.

According to Japanese Patent Laid-Open (Kokai) No. HEI 10-023096 referenced herein, particularly disclosed regarding a QAM system digital modem is a technology for a digital modem which is used for a multiplex radio device or a CATV. Specifically, this technology has the following five aims: first, reductions in the circuit sizes of roll-off filters and in power consumption by the roll-off filters; second, prevention of an increase in the circuit size even if a carrier has a high multiplication of a symbol rate; third, elimination of the necessity of changing an oscillator frequency used for frequency conversion even if a carrier frequency is changed; fourth, prevention of cost increases for an AGC circuit even if a carrier frequency has a high multiplication of a symbol rate; and, fifth, correction of a frequency characteristic of a modulated wave after D/A conversion by a D/A converter to be flat in shape.

Referring now to FIG. 19, illustrated is an aspect of the transmitter of a digital modulation system radio transmitter-receiver disclosed in Japanese Patent Laid-Open (Kokai) No. HEI 10-023096. A digital modulation apparatus 100 shown in FIG. 19 comprises four roll-off filters 101, 102, 103 and 104, two inverting means 105 and 106, selecting and outputting means 107 and a D/A converting means 108.

Herein, the operating speeds of the four roll-off filters are not n multiple oversampling speeds but symbol clock speeds. The selecting and outputting means 107 switches signals outputted from the four elements including the roll-off filters 101 and 103 and the inverting means 105 and 106 by a sampling clock having a speed faster by 4 times than a symbol clock. The D/A converting means 108 converts and outputs a signal outputted from the selecting and outputting means 107 by a sampling clock having a speed faster by 4 times than a symbol speed.

With the configuration made in the above manner, reductions can be made in the circuit sizes of the roll-off filters of the digital modulation apparatus 100 and power consumption in the roll-off filters.

To summarize, the problems inherent in the foregoing systems provided in the related art are as follows. In the case of using the digital system shown in FIG. 17, since a transmitted frequency is a value predetermined based on system data as described above, a phase rotational speed for a baseband signal must be matched with this value. Moreover, because of no RF elements which operate in frequency bands other than an existing band or because of no operation guarantees, an RF circuit must be configured by using one of a currently used frequency band.

Another problem concerns the method for obtaining a transmission speed for a baseband signal by using a multi-valued modulation system such as a QAM. The increased number of multivalues leads to an increase in the number of digital processing bits and thus an increase in the size of the digital circuit. Consequently, costs and power consumption are increased.

For solving the above problems, a digital system like that shown in FIG. 18 is utilized. In this case, transmission is performed by up-converting a modulated wave into a desired frequency by using a second carrier.

For the purpose of solving the problem of the increases in costs and power consumption among others described above, the technology for reducing a circuit size and power consumption is disclosed in Japanese Patent Laid-Open (Kokai) No. HEI 10-023096.

However, the circuit based on the above technology is complex in configuration, and there is a portion of an analog D/A converter. Thus, it is difficult to turn the circuit into LSI.

SUMMARY OF THE INVENTION

The present invention is made in order to solve the problems discussed above. It is an object of the invention to provide an apparatus which can perform frequency conversion into a transmitted frequency coincident with system data without using an analog circuit for conversion into a second frequency, increase a limit value of this transmitted frequency, simplify and miniaturize a circuit configuration by fully digitizing a circuit so as to turn the circuit into LSI and thereby increase accuracy and cost effectiveness.

To achieve the foregoing object, according to an aspect of the present invention, a digital modulation apparatus comprises a quadrature amplitude modulation unit for modulating first and second baseband digital signals orthogonal to each other by means of digital cosine/sine information obtained based on information regarding a carrier frequency which is n multiple (n is an integer $\geq 2$) of a local frequency, and a phase rotation unit provided in the input side of the quadrature amplitude modulation unit for performing phase rotation for the first and second baseband digital signals by using a difference frequency equivalent to a difference between the local frequency and a baseband frequency.

The digital modulation apparatus thus configured is advantageous for promoting general applicability of transmitting members, since a frequency can be converted into a transmitted frequency coincident with system data without using an analog circuit for conversion into a second frequency. It is also advantageous for facilitating the turning of a circuit into LSI, since a circuit configuration can be simplified and miniaturized by fully digitizing the circuit. It is yet further advantageous for increasing circuit cost effectiveness, since the difference frequency is moved at a low speed.

The quadrature amplitude modulation unit may be constructed to include a carrier frequency/phase generator for outputting phase information by using information regarding the carrier frequency, a first cosine/sine information storage unit for receiving the phase information from the carrier frequency/phase generator and outputting digital cosine/sine information equivalent to the phase information, and an operation unit for multiplying the digital cosine information from the first cosine/sine information storage unit by the first baseband digital signal, multiplying the digital sine information from the first cosine/sine information storage unit by the second baseband digital signal and then adding together both of these multiplying results. The carrier frequency/phase generator can be constructed to include a frequency generator for generating the carrier frequency and a counter for receiving the output of the frequency generator and outputting the phase information.

Thus, since the carrier frequency/phase generator may be constructed to include the frequency generator for generating the carrier frequency and the counter for receiving the output of the frequency generator and outputting the phase information and thereby a frequency can be converted into a transmitted frequency coincided with system data without using an analog circuit for conversion into a second frequency, the above construction is advantageous for increasing general applicability of transmitting members. Since a circuit can be fully digitized so as to simplify and miniaturize a circuit configuration, it is also advantageous for facilitating the turning of the circuit into LSI. Furthermore, since a difference a frequency is moved at a low speed, it is advantageous for increasing circuit cost effectiveness.

The quadrature amplitude modulation unit can be constructed to include a carrier frequency/phase generator for outputting phase information by using information regarding the carrier frequency, a phase adjustment unit for branching the first and second baseband digital signals respectively into required numbers and then performing phase rotation for the branched first and second baseband digital signals respectively, and a selector unit for sequentially selecting and outputting the first and second baseband digital signals and the phase-rotated first and second baseband digital signals from the phase adjustment unit by using the phase information from the carrier frequency/phase generator as switching information. The carrier frequency/phase generator can be constructed to include a frequency generator for generating the carrier frequency and a counter for receiving the output of the frequency generator and outputting the phase information.

Thus, since the carrier frequency/phase generator may be constructed to include the frequency generator for generating the carrier frequency and the counter for receiving the output of the frequency generator and outputting the phase information and thereby a frequency can be converted into a transmitted frequency coincided with system data without using an analog circuit for conversion into a second frequency, the above construction is advantageous for increasing general applicability of transmitting members. Since the simple selector enables a modulation unit to be realized and circuit full digitization enables a circuit configuration to be simplified and miniaturized, it is also advantageous for facilitating the turning of the circuit into LSI can be facilitated. Moreover, since a difference frequency is moved at a low speed, it is advantageous for increasing circuit cost effectiveness.

The phase rotation unit can be constructed to include a difference frequency/phase generator for outputting phase information by using information regarding the difference frequency, a second cosine/sine information storage unit for receiving the phase information from the difference frequency/phase generator and then outputting digital cosine/sine information equivalent to the phase information, and a phase rotation execution unit for executing phase rotation for the first and second baseband digital signals by using the digital cosine/sine information from the second cosine/sine information storage unit.

Thus, the above construction is advantageous for converting a frequency into an optional transmitted frequency.

The difference frequency/phase generator may be constructed to include a difference frequency generator for generating the difference frequency and a counter for receiving the output of the difference frequency generator and outputting the phase information.

In this case, the difference frequency/phase generator can be constructed to include difference frequency setting means for setting the difference frequency and an accumulator having a multiplication unit and a buffer unit for temporarily storing the output of the multiplication unit for multiplying information regarding the difference frequency by an output from the buffer unit in the multiplication unit and then outputting information stored in the buffer.

Thus, the above construction is advantageous for increasing circuit cost effectiveness by a low-speed movement.

On the other hand, in the input side of the phase rotation unit, an oversampling unit may be provided for performing oversampling for the first and second baseband digital signals respectively.

Herein, the oversampling unit may be constructed to include an FIR filter and a linear interpolation circuit.

Thus, the above construction is advantageous for obtaining a high sampling frequency and thereby setting a local frequency to be higher than an original limit value.

According to another aspect of the present invention, a digital modulation apparatus comprises a first quadrature amplitude modulation unit for modulating first and second baseband digital signals orthogonal to each other by means of digital cosine/sine information obtained based on information regarding a carrier frequency which is n multiple (n is an integer $\geq 2$) of a local frequency, a second quadrature amplitude modulation unit for modulating the first and second baseband digital signals by means of digital cosine/sine information different in phase by 90° from the digital cosine/sine information used in the first quadrature amplitude modulation unit, a difference frequency/phase generator for outputting phase information by using information regarding a difference frequency which is equivalent to a difference between the local frequency and a baseband frequency, a third cosine/sine information storage unit for receiving the phase information from the difference frequency/phase generator and outputting digital cosine/sine information equivalent to the phase information, and an operation unit for multiplying the digital cosine information from the third cosine/sine information storage unit with the output of the first quadrature amplitude modulation unit, multiplying the digital sine information from the third cosine/sine information storage unit with the output of the second quadrature amplitude modulation unit and adding together both of these multiplying results.

The digital modulation apparatus thus configured is advantageous for promoting general applicability of transmitting members, since a high sampling frequency can be obtained to set a local frequency higher than an original limit value and a frequency can be converted into a transmitted frequency coincided with system data without using an analog circuit for conversion into a second frequency. With full digitization of a circuit, a circuit configuration can be simplified and miniaturized, and thus the turning of the circuit into LSI can be facilitated. As a result, high accuracy and high cost effectiveness can be promoted. It is also advantageous for increasing cost effectiveness, since a difference frequency is moved at a low speed.

The first quadrature amplitude modulation unit can be constructed to include a carrier frequency/phase generator for outputting phase information by using information regarding the carrier frequency, a phase adjustment unit for branching the first and second baseband digital signals respectively into required numbers and performing phase rotation for the branched first and second baseband digital signals respectively, and a first selector unit for sequentially selecting and outputting the first and second baseband digital signals and the phase-rotated first and second baseband digital signals from the phase adjustment unit by using the phase information from the carrier frequency/phase generator as switching information. The second quadrature amplitude modulation unit can be constructed to share the above carrier frequency/phase generator and phase adjustment unit with the first quadrature amplitude modulation unit and include a second selector unit for sequentially selecting and outputting the first and second baseband digital signals and the phase-rotated first and second baseband digital signals from the phase adjustment unit by using the phase information from the carrier frequency/phase generator as switching information and selecting phases different by 90° from those of the first selector unit.

Thus, the above construction is advantageous for promoting general applicability of transmitting members, since a high sampling frequency can be obtained to set a local frequency higher than an original limit value and a frequency can be converted into a transmitted frequency coincided with system data without using an analog circuit for conversion into a second frequency. Since a modulation unit can be constructed by a simple selector and a circuit can be fully digitized, a circuit configuration can be simplified and miniaturized to facilitate the turning of the circuit into LSI. As a result, high accuracy and high cost effectiveness can be promoted. It is also advantageous for increasing circuit cost effectiveness, since a difference frequency is moved at a low speed.

Herein, the carrier frequency/phase generator may be constructed to include a frequency generator for generating the carrier frequency and a counter for receiving the output of the frequency generator and outputting the phase information.

Thus, the above construction is advantageous for promoting general applicability of transmitting members, since a frequency can be converted into a transmitted frequency coincided with system data without using an analog circuit for conversion into a second frequency.

The difference frequency/phase generator may be constructed to include a frequency generator for generating the difference frequency and a counter for receiving the output of the frequency generator and outputting the phase information. Also, the difference frequency/phase generator may be constructed to include difference frequency setting means for setting the difference frequency and an accumulator having a multiplication unit and a buffer unit for temporarily storing the output of the multiplication unit for multiplying information regarding the difference frequency by an output from the buffer unit in the multiplication unit and outputting information stored in the buffer unit.

Thus, the above construction is advantageous for promoting general applicability of transmitting members, since a frequency can be converted into a transmitted frequency coincided with system data without using an analog circuit for conversion into a second frequency. Since a modulation unit can be constructed by a simple selector and a circuit can be fully digitized, a circuit configuration can be simplified and miniaturized to facilitate the turning of the circuit into LSI. As a result, high accuracy and high cost effectiveness can be promoted. It is also advantageous for increasing circuit cost effectiveness, since a difference frequency is moved at a low speed.

Furthermore, in the input sides of the first and second quadrature amplitude modulation units, oversampling units may be provided for performing oversampling for the first and second baseband digital signals respectively.

The oversampling units may be constructed to include FIR filters and linear interpolation circuits.

Thus, the above construction is advantageous for promoting general applicability of transmitting members, since a high sampling frequency can be obtained to set a local frequency higher than an original limit value and a frequency can be converted into a transmitted frequency coincided with system data without using an analog circuit for conversion into a second frequency. Full digitization of a circuit enables a circuit configuration to be simplified and miniaturized to facilitate the turning of the circuit into LSI. As a result, high accuracy and high cost effectiveness can be promoted. It is also advantageous for increasing circuit cost effectiveness, since a difference frequency is moved at a low speed.

BRIEF DESCRIPTION OF THE DRAWINGS

These and other objects, features and advantages of the present invention will become apparent upon reading of the following detailed description and drawings, in which.

DESCRIPTION OF THE PREFERRED EMBODIMENTS

Next, the preferred embodiments of the present invention will be described with reference to the accompanying drawings.

(A) First Embodiment

The digital modulation apparatus of the present invention is designed to obtain a transmitted frequency coincided with system data by employing a system for phase-rotating a baseband signal and then directly up-converting this signal into a signal of an RF band without conversion into a second frequency. Thus, a phase rotation unit is provided in the input side of a quadrature amplitude modulation unit for forcibly rotating the phase of the baseband signal.

Figure 1:
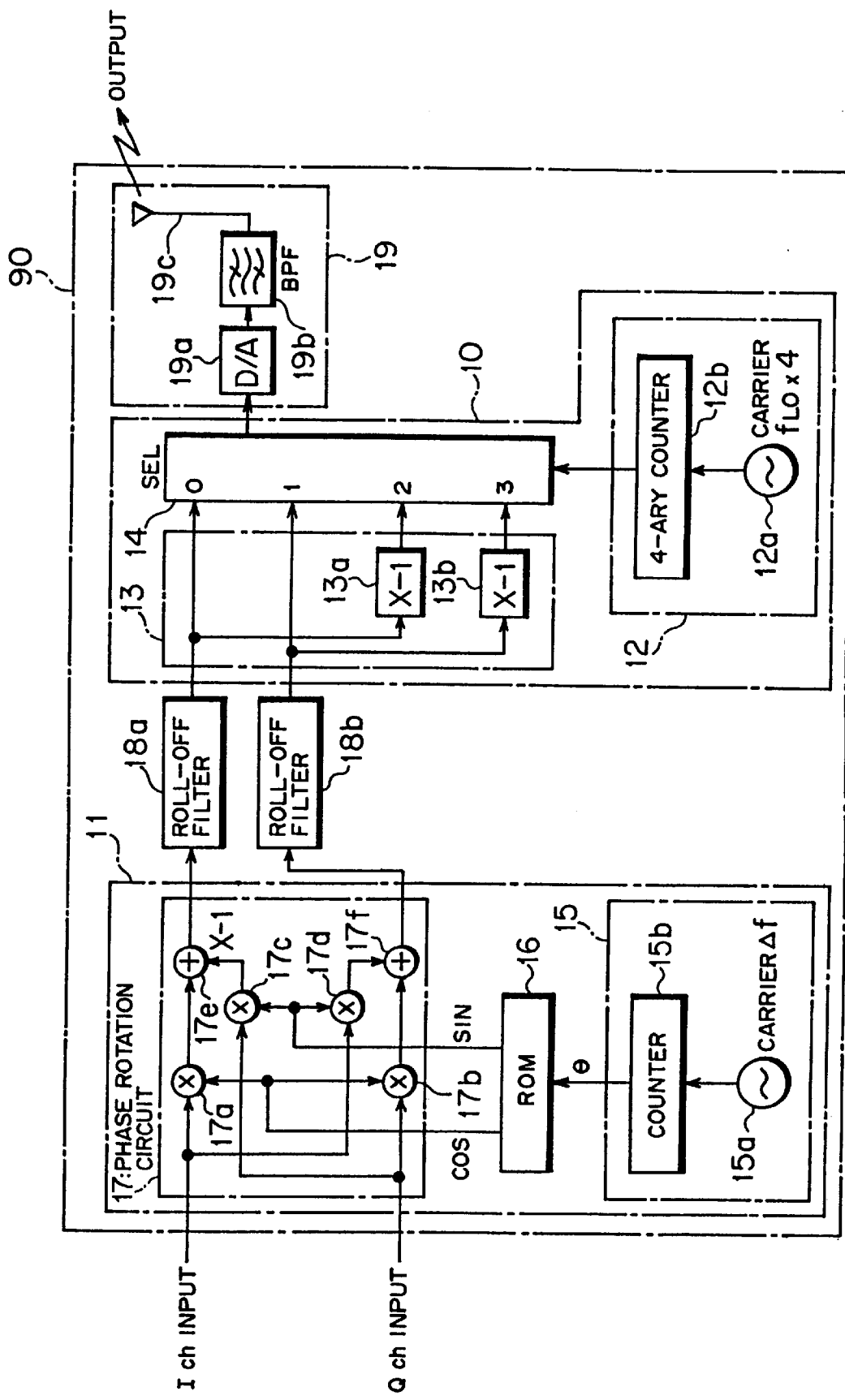
FIG. 1 is a block diagram showing a digital modulation apparatus of a first embodiment of the present invention.

Referring to FIG. 1, shown is a digital modulation radio transmitter of the first embodiment of the present invention. A digital modulation apparatus 90 shown in FIG. 1 increases a band frequency for a baseband signal without using a second carrier generation unit. The digital modulation apparatus 90 comprises a selector type quadrature amplitude modulation unit 10, a phase rotation unit 11, roll-off filters 18a and 18b and a transmission rear stage unit 19.

Herein, the three sections including the roll-off filters 18a and 18b, the selector type quadrature amplitude modulation unit 10 and the transmission rear stage unit 19 constitute modules for performing quadrature amplitude modulation and transmission. The phase rotation unit 11 is located in the input side of the selector type quadrature amplitude modulation unit 10, and it is provided for forcibly rotating the phase of a baseband signal. Accordingly, the selector type quadrature amplitude modulation unit 10, the roll-off filters 18a and 18b and the transmission rear stage unit 19 will be described first, and then the phase rotation unit 11 will be described.

Described first is the selector type quadrature amplitude modulation unit 10. This selector type quadrature amplitude modulation unit 10 modulates first and second baseband digital signals orthogonal to each other by means of digital cosine/sine information obtained based on a carrier frequency information which is n multiple (n is an integer $\geq 2$) of a local frequency. The selector type quadrature amplitude modulation unit 10 is constructed to include a carrier frequency/phase generator 12, a phase adjustment unit 13 and a selector unit 14.

Herein, the carrier frequency/phase generator 12 outputs phase information by using information regarding the carrier frequency. The carrier frequency/phase generator 12 is constructed to include a frequency generator 12a for generating the carrier frequency and a 4-ary counter 12b for receiving an output of the frequency generator 12a and outputting the phase information.

The phase adjustment unit 13 branches the first and second baseband digital signals respectively into two parts and then performs phase rotation for the branched first and second baseband digital signals respectively. The phase adjustment unit 13 is constructed to include phase adjusters 13a and 13b.

The phase adjusters 13a and 13b rotate the phases of baseband signals outputted from the roll-off filters 18a and 18b. For example, in the case of 4-multiplication of the present invention, there are four sampling timing points shifted by $\pi/2$ while a baseband signal is rotated once on a signal circle and, at each point, outputs are made in the order of I, Q, −I and −Q. The phase adjusters 13a and 13b have functions for rotating phases by $\pi$ like −I and −Q. In the case of other multiplication numbers n, weight of factors is given based on amplitude information.

The selector unit 14 sequentially selecting and outputting the first and second baseband digital signals and the phase-rotated first and second baseband digital signals from the phase adjustment unit 13 by using the phase information from the carrier frequency/phase generator 12 as switching information. In other words, signals are inputted respectively, I from the roll-off filter 18a, Q from the roll-off filter 18b, −I from the phase adjuster 13a and −Q from the phase adjuster 13b. Then, based on a selected signal from the 4-ary counter 12a, the signals are selected in the order of the above four signals one by one and then each is outputted to the rear stage.

Described next is the operation of the selector type quadrature amplitude modulation unit 10.

If a multiplication number is 4, sampling is performed by four times for one data on the speed of a symbol clock. In the case of this sampling, cosine and sine values take four kinds of simple values like the following. A speed is $4 \times f_{SYMBOL}$ (Hz).

Cosine=1, 0, −1, 0, 1, 0, −1, 0, . . .

Sine=0, 1, 0, −1, 0, 1, 0, −1, . . .

An Ich signal from the roll-off filter 18a is multiplied by the cosine values. Accordingly, a data string of $4 \times f_{SYMBOL}$ (Hz) is as follows.

$$I, 0, -I, 0, I, 0, -I, 0, I, 0, -I, \quad (1\text{-}1)$$

Likewise, a Qch signal from the roll-off filter 18b is multiplied by the sine values. Accordingly, a data string of $4 \times f_{SYMBOL}$ (Hz) is as follows.

$$0, Q, 0, -Q, 0, Q, 0, -Q, 0, Q, 0, \quad (1\text{-}2)$$

Then, the above outputs are coupled together to obtain a modulated wave. In other words, a modulated date string like the following is obtained by the expressions (1-1) and (1-2).

$$I, Q, -I, -Q, I, Q, -I, -Q, I, Q, -I, \quad (1\text{-}3)$$

Four kinds of signals I, Q, −I and −Q changed by a clock of $4 \times f_{SYMBOL}$ (Hz) only appear in the outputs as represented by the expression (1-3). Thus, by utilizing this phenomenon, one is selected from the above four kinds of signals and then four kinds of repeated strings of I, Q, −I and −Q of $4 \times f_{SYMBOL}$ (Hz) are obtained.

The roll-off filters 18a and 18b process signals outputted from the phase rotation unit 11 such that intersymbol interference can be reduced to a minimum in a receiving side. The roll-off filters 18a and 18b should be positioned either before or after the phase rotation unit 11.

The transmission rear stage unit 19 limits a transmission band for a signal outputted from the selector type quadrature amplitude modulation unit 10 and transmits the signal onto a radio channel. The transmission rear stage unit 19 is constructed to include a D/A converter 19a a band-pass filter 19b and an antenna 19c.

Herein, the D/A converter 19a converts the signal outputted from the selector type quadrature amplitude modulation unit 10 from digital to analog. The band-pass filter 19b limits a band for a signal outputted from the D/A converter 19a and eliminates unnecessary harmonics. The antenna 19c sends a transmitting signal outputted from the band-pass filter 19b to the radio channel.

Thus, inputted signals are passed through the roll-off filters 18a and 18b, subjected to quadrature amplitude modulation in the selector type quadrature amplitude modulation unit 10, converted into a transmitted frequency having a speed faster by 4 times than that of an original baseband signal and this is then transmitted from the transmission rear stage unit 19.

Described next is the phase rotation unit 11 provided in the input side of the selector type quadrature amplitude modulation unit 10.

The phase rotation unit 11 is provided in the input side of the selector type quadrature amplitude modulation unit 10 for performing phase rotation for the first and second baseband digital signals by using a difference frequency $\Delta f$ equivalent to a difference between a local frequency and a baseband frequency. The phase rotation unit 11 is constructed to include a difference frequency/phase generator 15, a second cosine/sine information storage unit 16 and a phase rotation execution unit (phase rotation circuit) 17.

The difference frequency/phase generator 15 outputs phase information $\Theta(t)$ by using information regarding the difference frequency $\Delta f$. The difference frequency/phase generator 15 is constructed to include a difference frequency generator 15a for generating the difference frequency $\Delta f$ and a counter 15b for receiving the output of the difference frequency generator 15a and outputting the phase information $\Theta(t)$.

Figure 2:
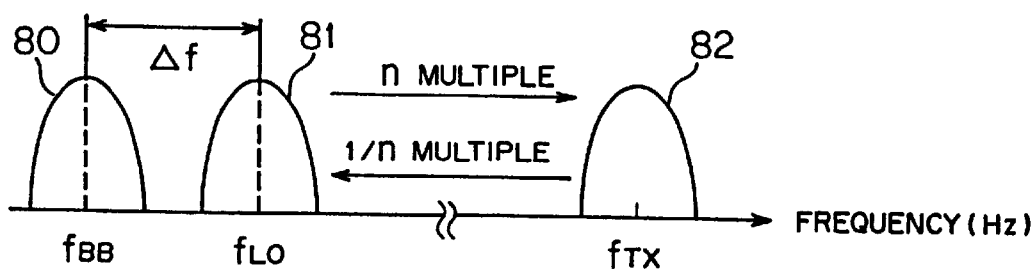
FIG. 2 is a view illustrating a concept of a difference frequency.

The difference frequency $\Delta f$ will now be described by referring to FIG. 2. As shown in FIG. 2, three spectra having frequencies $f_{BB}$, $f_{LO}$ and $f_{TX}$ are arranged. Herein, spectra 80, 81 and 82 respectively indicate a baseband signal having the frequency $f_{BB}$, a local signal having the frequency $f_{LO}$ and a transmitting signal having the frequency $f_{TX}$.

As described above, even if the spectrum 80 for the baseband signal having the frequency $f_{BB}$ is n multiplied (n is an integer $\geq 2$), it will not become equal to the spectrum 82 for the transmitted frequency signal (frequency $f_{TX}$) in most cases. This is attributed to the fact that since a value taken by a baseband signal band is almost a fixed band and a value taken by a transmitted frequency signal band is decided by system data, even if the baseband signal is directly converted into a signal having a clock which is an integral multiple of a symbol clock synchronized with this baseband signal, it will not be coincided with the transmitted frequency.

Thus, phase rotation is first performed for the baseband signal spectrum 80 in a low-speed frequency region, the spectrum 80 is then converted into the spectrum 81 for the local frequency signal having the frequency $f_{LO}$, and then this local frequency signal spectrum 81 is n-multiplied to obtain the spectrum 82 for the transmitted frequency signal.

Hereinafter, a difference between the baseband signal frequency $f_{BB}$ and the local signal frequency $f_{LO}$ is called a difference frequency $\Delta f$.

Figure 3:
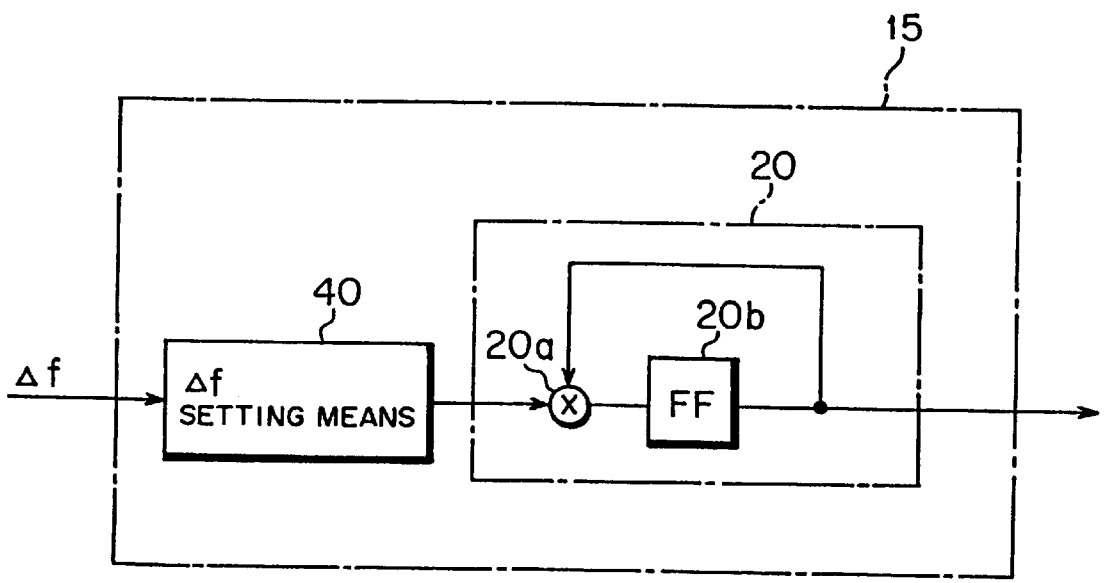
FIG. 3 is a block diagram showing a difference frequency/phase generator composed of Δf setting means and an accumulator.

For the difference frequency/phase generator 15 for outputting phase information based on the difference frequency $\Delta f$, its circuit can be configured like that shown in FIG. 3.

Specifically, as shown in FIG. 3, the difference frequency/phase generator 15 is constructed to include $\Delta f$ setting means 40 and a phase information accumulator 20 composed of a multiplication unit 20a and a buffer unit 20b.

Herein, the $\Delta f$ setting means 40 receives difference frequency information and then outputs this value to the buffer unit 20b. The phase information accumulator 20 obtains the difference frequency information from the $\Delta f$ setting means 40 and performs counting-up for each carrier clock.

The multiplication unit 20a included in the phase information accumulator 20 multiplies the difference frequency information by an output from the buffer unit 20b. The buffer unit 20b outputs stored information. Thus, the phase information accumulator 20 is operated such that a fixed value is integrated for each clock and, when the difference frequency $\Delta f$ is reached, a value can be returned to 0 instantaneously.

Specifically, first, the buffer unit 20b resets its stored content and, when a carrier clock comes in, the content stored in the buffer unit 20b is counted up. When a next carrier clock comes in, the content stored in the buffer unit 20b is feedback and multiplied by the multiplication unit 20a, and then its result is inputted to the buffer unit 20b again and added therein. Thereafter, similarly, counting-up is performed for the buffer unit 20b and, when the accumulated value of the buffer unit 20b exceeds a specified threshold value, resetting is made instantaneously and the value is returned to 0. As a result, by the $\Delta f$ setting means 40 and the phase information accumulator 20, the phase information $\Theta(t)$ is outputted by using information regarding the difference frequency $\Delta f$.

Next operated is the second cosine/sine information storage unit 16 shown in FIG. 1, which receives the phase information $\Theta(t)$ from the difference frequency/phase generator 15 and outputs digital cosine/sine information cos $\Theta(t)$/sin $\Theta(t)$. Specifically used for this purpose is a ROM for outputting an amplitude value having a digital sine/cosine waveform based on an address indicating the phase information $\Theta(t)$.

The phase rotation execution unit 17 executes phase rotation for the first and second baseband digital signals by using the digital cosine/sine information cos $\Theta(t)$/sin $\Theta(t)$ from the second cosine/sine information storage unit 16. The phase rotation execution unit 17 is constructed to include four multipliers 17a, 17b, 17c and 17d and two adders 17e and 17f.

The phase rotation execution unit 17 thus constructed forcibly advances the phase angles of inputted baseband signals, and outputs the baseband signals after increasing a band frequency for these signals.

Specifically, an operation for providing an angle $\Theta$ equal to the difference frequency $\Delta f$ to the first and second baseband digital signals is equivalent to making faster of exprotation by forcibly rotating a phase item $\phi$ for advancing the angle $\Theta(t)$ in baseband signal $V(t)=\exp[j\cdot\Theta(t)]=\exp[j\cdot(\omega t+\phi)]$.

To use signal space jargon, the operation is equivalent to the increase of a speed for left rotation around an original point on signal space by multiplying a rotation matrix for the baseband signal $V(t)$ where a signal point coordinate is [cos $\Theta(t)$, sin $\Theta(t)$].

In other words, this rotation operation is represented by the following expressions (2-1) and (2-2).

$$I_{OUT}=I_{IN}\times\cos\Theta(t)-Q_{IN}\times\sin\Theta(t) \quad (2\text{-}1)$$

$$Q_{OUT}=Q_{IN}\times\cos\Theta(t)+I_{IN}\times\sin\Theta(t) \quad (2\text{-}2)$$

Herein, inputted Ich and Qch signals are $I_{IN}$ and $Q_{IN}$, and outputted Ich and Qch signals are $I_{OUT}$ and $Q_{OUT}$.

The rotation operations represented by the above expressions (2-1) and (2-2) are executed by the four multipliers 17a, 17b, 17c and 17d and the two adders 17e and 17f included in the phase rotation execution unit 17.

Specifically, the inputted signal $I_{IN}$ is multiplied by a digital cosine component outputted from the second cosine/sine information storage unit 16 in the multiplier 17a (first item in the expression 2-1). The inputted signal $Q_{IN}$ is multiplied by a sine component outputted from the second cosine/sine information storage unit 16 in the multiplier 17c (second item in the expression 2-1). Then, in the adder 17e, the inverted output of the multiplier 17c and the output of the multiplier 17a are added together.

Likewise, the inputted signal $I_{IN}$ is multiplied by the digital sine component outputted from the second cosine/sine information storage unit 16 in the multiplier 17d (second item in the expression 2-2). The inputted signal $Q_{IN}$ is multiplied by the digital cosine component outputted from the second cosine/sine information storage unit 16 in the multiplier 17b (first item in the expression 2-2). Then, in the adder 17f, the outputs of the multipliers 17b and 17d are added together.

Thus, since the rotation operations are performed in the phase rotation unit 11, a frequency for the inputted baseband signals is increased by an amount equal to the difference frequency $\Delta f$, and then the baseband signals are outputted. Then, the baseband signals are passed through the roll-off filters 18a and 18b, modulated in the selector type quadrature amplitude modulation unit 10 and then transmitted from the transmission rear stage unit 19.

With the above construction, the inputted baseband signals are subjected to quadrature amplitude modulation and then transmitted. Specifically, the first and second baseband digital signals are inputted to the phase rotation unit 11. Then, in the second cosine/sine information storage unit 16 included in the phase rotation unit 11, the phase information $\Theta(t)$ is received from the difference frequency/phase generator 15, and the digital cosine/sine information cos $\Theta(t)$/sin $\Theta(t)$ equivalent to the phase information $\Theta(t)$ is outputted. Then, in the phase rotation execution unit 17, phase rotation is performed for the first and second baseband digital signals by using the digital cosine/sine information cos $\Theta(t)$/sin $\Theta(t)$ from the second cosine/sine information storage unit 16, and then a frequency is converted into a local frequency having a frequency $f_{LO}$ higher by an amount equal to the difference frequency $\Delta f$.

Then, the first and second baseband digital signals outputted from the phase rotation execution unit 17 are processed in the roll-off filters 18a and 18b such that intersymbol interference can be reduced to a minimum in the receiving side, and then inputted to the selector type quadrature amplitude modulation unit 10.

The first baseband digital signal outputted from the roll-off filter 18a is branched into two parts in the phase adjustment unit 13. One part of the branched first baseband digital signal is inputted to the selector unit 14 by the phase adjuster 13a. The other part of the branched first baseband digital signal is phase-rotated by $\pi$ and then inputted to the selector unit 14. The second baseband digital signal outputted from the roll-off filter 18b is branched into two parts in the phase adjustment unit 13. One part of the branched second baseband signal is inputted to the selector unit 14 by the phase adjuster 13b. The other part of the branched second baseband digital signal is phase-rotated by $\pi$ and then inputted to the selector unit 14.

Then, in the selector unit 14, the first and second baseband digital signals and the phase-rotated first and second baseband digital signals from the phase adjustment unit 13 are sequentially selected and outputted by using, as switching information, the phase information outputted from the carrier frequency/phase generator 12 by using information regarding the carrier frequency.

Then, in the transmission rear stage 19, the selected and outputted signals are converted from digital to analog by the D/A converter 19a. The transmitting signals are subjected to band limitation in the band-pass filter 19b for eliminating unnecessary harmonics, and then sent from the antenna 19c to the radio channel.

Accordingly, frequency conversion by an analog circuit is made unnecessary. In other words, in the system for rotating the phases of the baseband signals and directly up-converting the frequency into the RF band, the frequency can be converted into a transmitted frequency coincided with system data without using a circuit for conversion into a second frequency, and thus general applicability of the transmitting members can be promoted. Since the modulation unit can be realized by the simple selector and the circuits from the phase rotation unit 11 to the selector type quadrature amplitude modulation unit 10 can be fully digitized to simplify and miniaturize a circuit configuration, the turning of the circuit into LSI can be facilitated. Moreover, the system is particularly effective when a value of the difference frequency $\Delta f$ is small. That is, since the frequency of the difference frequency generator 15a is moved at a low speed of $\Delta f$, circuit cost effectiveness can be increased.

Also, similar effects can be provided even if the difference frequency/phase generator 15 is composed of the circuit having the $\Delta f$ setting means 40 and the phase information accumulator 20.

(B) Second Embodiment

In the foregoing first embodiment, a frequency multiplication number n is set to 4 and the quadrature amplitude modulation unit is allowed to be composed of the selector. But this portion can be replaced by another circuit.

Figure 4:
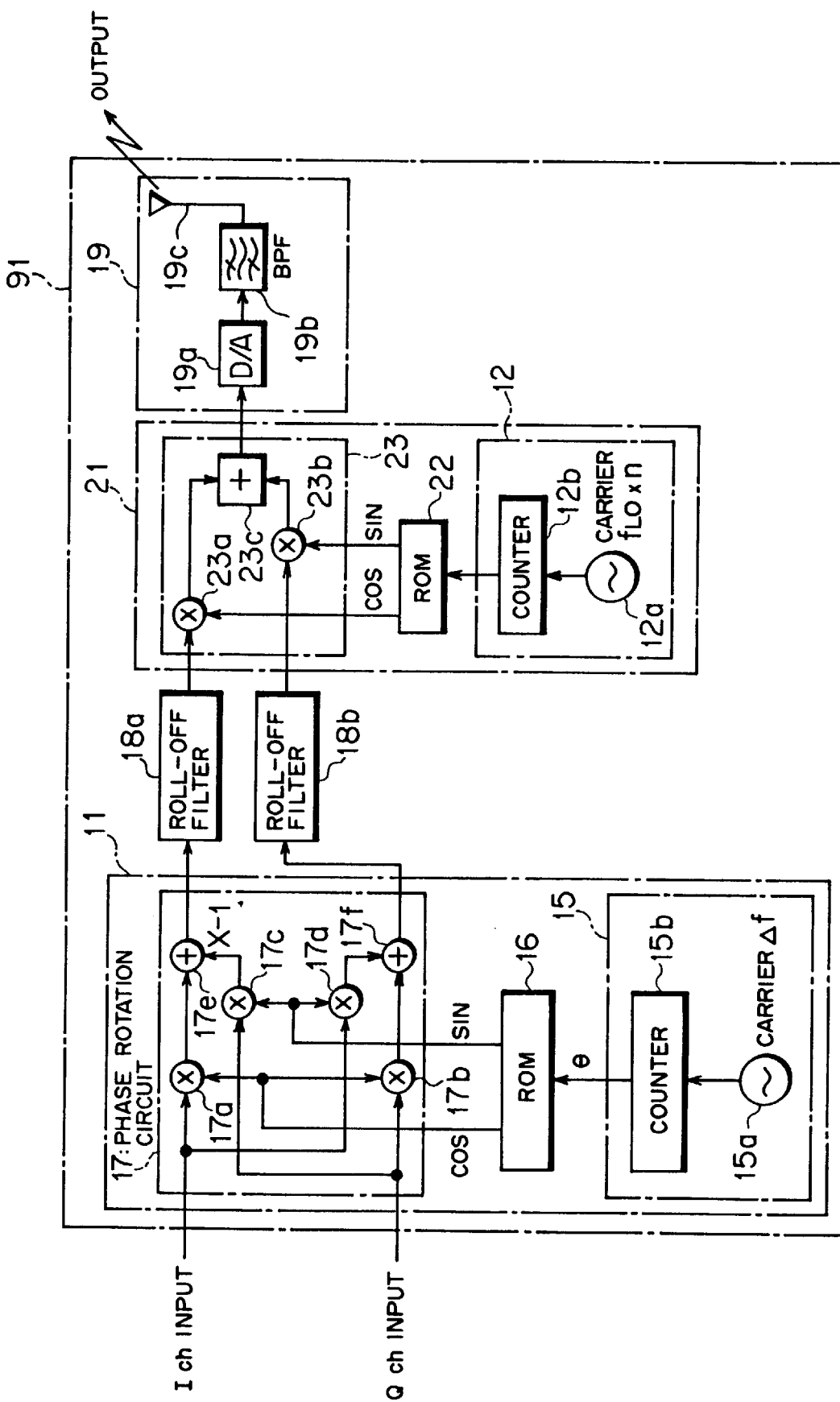
FIG. 4 is a block diagram showing a digital modulation apparatus of a second embodiment of the present invention.

Referring to FIG. 4, shown is a digital modulation radio transmitter of the second embodiment of the present invention. A digital modulation apparatus 91 shown in FIG. 4 increases a band frequency for a baseband signal without using a second carrier circuit. The digital modulation apparatus 91 comprises a phase rotation unit 11, roll-off filters 18a and 18b, a transmission rear stage unit 19 and a multiplication type quadrature amplitude modulation unit 21.

The multiplication type quadrature amplitude modulation unit 21 modulates first and second baseband digital signals orthogonal to each other by means of digital cosine/sine information obtained based on information regarding a carrier frequency which is n multiple (n is an integer $\geq 2$) of a local frequency. The multiplication type quadrature amplitude modulation unit 21 is constructed to include a carrier frequency/phase generator 12, a first cosine/sine information storage unit 22 and an operation unit 23.

Herein, the carrier frequency/phase generator 12 outputs phase information by using information regarding the carrier frequency. The first cosine/sine information storage unit 22 receives the phase information from the carrier frequency/phase generator 12 and outputs digital cosine/sine information equivalent to the phase information.

The operation unit 23 multiplies the first baseband digital signal by the digital cosine information from the first cosine/sine information storage unit 22, multiplies the second baseband digital signal by the digital sine information from the first cosine/sine information storage unit 22, adds together both of these multiplying results and then outputs the added results. The operation unit 23 is constructed to include multipliers 23a and 23b and an adder 23c.

In the multiplier 23a, the first baseband digital signal is multiplied by the digital cosine information from the first cosine/sine information storage unit 22. In the multiplier 23b, the second baseband digital signal is multiplied by the digital sine information from the first cosine/sine information storage unit 22. Then, in the adder 23c, the outputs of these multipliers 23a and 23b are added together.

In FIG. 4, members having the same reference numerals as those of the first embodiment are the same members or members having the same functions, and thus further description thereof will be omitted.

The roll-off filters 18a and 18b may be positioned either before or after the phase rotation unit 11.

Thus, the digital modulation apparatus 91 is configured to comprise the multiplication type quadrature amplitude modulation unit 21 for modulating the first and second baseband digital signals orthogonal to each other by means of the digital cosine/sine information obtained based on information regarding the carrier frequency which is n multiple (n is an integer $\geq 2$) of the local frequency and the phase rotation unit 11 provided in the input side of the multiplication type quadrature amplitude modulation unit 21 for performing phase rotation for the first and second baseband signals by using a difference frequency equivalent to a difference between the local frequency and a baseband frequency.

The multiplication quadrature amplitude modulation unit 21 is constructed to include the carrier frequency/phase generator 12 for outputting the phase information by using information regarding the carrier frequency, the first cosine/sine information storage unit 22 for receiving the phase information from the carrier frequency/phase generator 12 and outputting the digital cosine/sine information equivalent to the phase information and the operation unit 23 for multiplying the first baseband digital signal by the digital cosine information from the first cosine/sine information storage unit 22, multiplying the second baseband digital signal by the digital sine information from the first cosine/sine information storage unit 22 and then adding together both of these multiplying results.

The carrier frequency/phase generator 12 is constructed to include a frequency generator 12a for generating the carrier frequency and a counter 12b for receiving the output of the frequency generator 12a and outputting the phase information.

The phase rotation unit 11 is constructed to include a difference frequency/phase generator 15 for outputting phase information $\Theta(t)$ by using information regarding a difference frequency $\Delta f$, a second cosine/sine information storage unit 16 for receiving the phase information $\Theta(t)$ from the difference frequency/phase generator 15 and outputting digital cosine/sine information $\cos \Theta(t) /\sin \Theta(t)$ equivalent to the phase information $\Theta(t)$ and a phase rotation execution unit 17 for executing phase rotation for the first and second baseband digital signals by using the digital cosine/sine information $\cos \Theta(t)/\sin \Theta(t)$ from the second cosine/sine information storage unit 16.

Herein, the difference frequency/phase generator 15 is constructed to include a difference frequency generator 15a for generating the difference frequency and a counter 15b for receiving the output of the difference frequency generator 15a and outputting the phase information.

Also, in the present embodiment, the difference frequency/phase generator 15 may be replaced by a difference frequency/phase generator having Δf setting means 40 and a phase information accumulator 20 like that shown in FIG. 3.

With the above construction, the inputted first and second baseband digital signals are subjected to phase rotation in the phase rotation unit 11. Then, in the roll-off filters 18a and 18b, the first and second baseband digital signals are processed such that intersymbol interference can be reduced to a minimum in the receiving side, and then inputted to the multiplication type quadrature amplitude modulation unit 21.

Then, in the multiplication type quadrature amplitude modulation unit 21, the first and second baseband digital signals orthogonal to each other are modulated by means of the digital cosine/sine information obtained based on information regarding the carrier frequency which is n multiple (n is an integer ≧2) of the local frequency.

Then, in the transmission rear stage unit 19, the signal outputted from the multiplication type quadrature amplitude modulation unit 21 is converted from digital to analog by a D/A converter 19a. Then, in a band-pass filter 19b, band limitation is performed for the transmitting signal to eliminate unnecessary harmonics, and then the signal is outputted to a radio channel from the antenna 19c.

Accordingly, frequency conversion by an analog circuit is made unnecessary. In other words, in the system for rotating the phase of a baseband signal and directly up-converting the signal into an RF band, a frequency can be converted into a transmitted frequency coincided with system data without using a circuit for conversion into a second frequency, and thus general applicability of the transmitting members can be promoted. Also, since the circuits from the phase rotation unit 11 to the multiplication type quadrature amplitude modulation unit 21 can be fully digitized to simplify and miniaturize a circuit configuration, the turning of the circuit into LSI can be facilitated. Moreover, the system is particularly effective when a value of the difference frequency Δf is small. That is, since the frequency of the difference frequency generator 15a is moved at a low speed of Δf, circuit cost effectiveness can be increased.

(C) Third Embodiment

In the foregoing first or second embodiment, the phase rotation circuit is provided in the input side of the quadrature amplitude modulation unit. In the present embodiment, however, a signal outputted from a quadrature amplitude modulation unit is further subjected to quadrature modulation so as to obtain a transmitted frequency.

Figure 5:
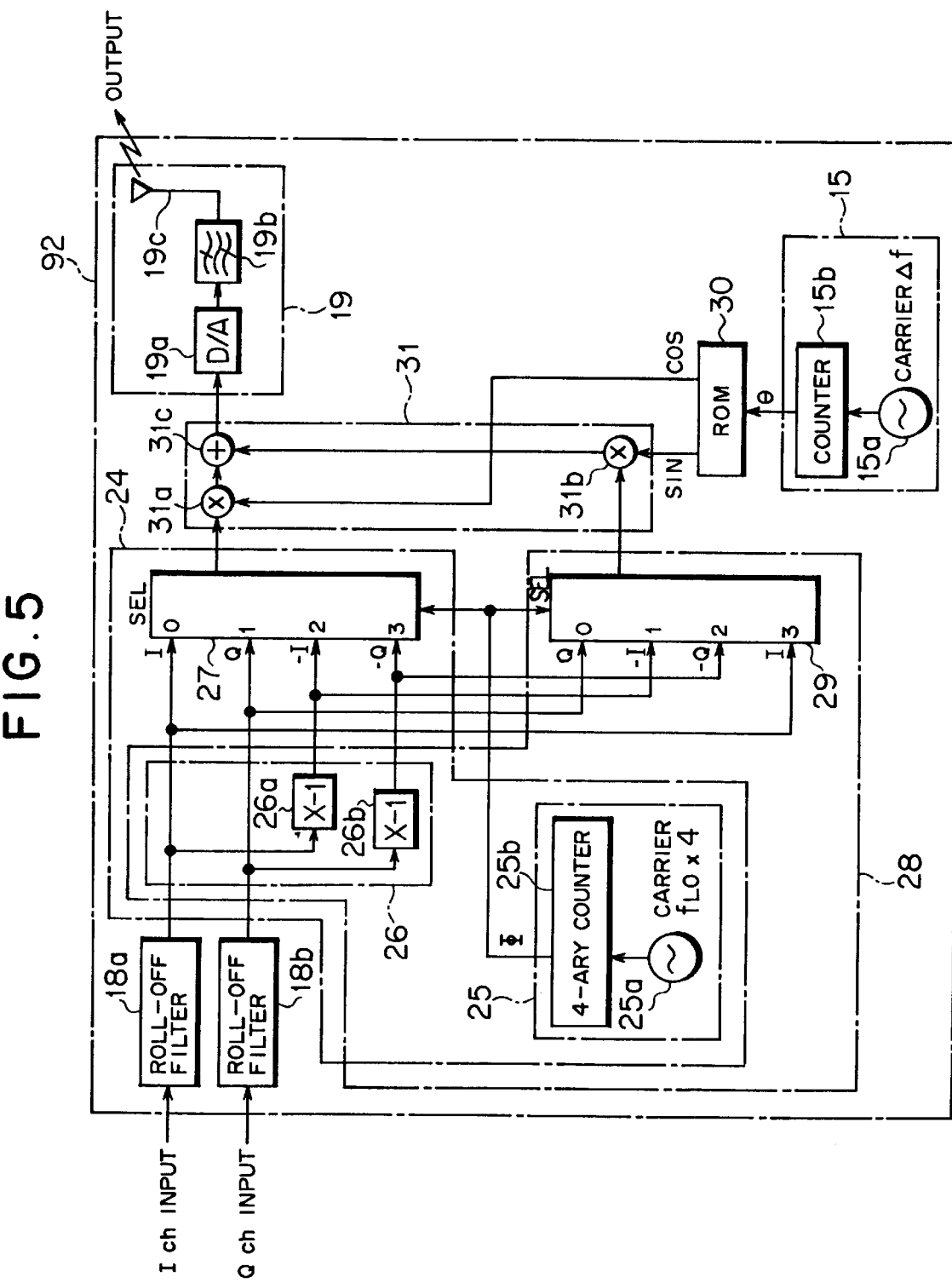
FIG. 5 is a block diagram showing a digital modulation apparatus of a third embodiment of the present invention.

Referring to FIG. 5, shown is a digital modulation radio transmitter of the third embodiment of the present invention. A digital modulation apparatus 92 shown in FIG. 5 increases a band frequency for an IF signal without using a second carrier circuit. The digital modulation apparatus 92 comprises roll-off filters 18a and 18b, a first selector type quadrature amplitude modulation unit 24, a second selector type quadrature amplitude modulation unit 28, a difference frequency/phase generator 15, a third cosine/sine information storage unit 30, an operation unit 31 and a transmission rear stage unit 19.

Herein, the first selector type quadrature amplitude modulation unit 24 performs quadrature amplitude modulation for first and second baseband digital signals. The first selector type quadrature modulation unit 24 is constructed to include a carrier frequency/phase generator 25, a phase adjustment unit 26 and a first selector unit 27.

The carrier frequency/phase generator 25 outputs phase information by using information regarding a carrier frequency. The carrier frequency/phase generator 25 is constructed to include a frequency generator 25a for generating the carrier frequency and a 4-ary counter 25b for receiving the output of this frequency generator 25a and outputting the phase information.

The phase adjustment unit 26 branches the first and second baseband digital signals respectively into required numbers and performs phase rotation for the branched first and second baseband digital signals respectively. For such processing, the phase adjustment unit 26 is constructed to include phase adjusters 26a and 26b.

The first selector unit 27 sequentially selects and outputs the first and second baseband digital signals and the phase-rotated first and second baseband digital signals from the phase adjustment unit 26 by using the phase information from the carrier frequency/phase generator 25 as switching information.

The second selector type quadrature amplitude modulation unit 28 is constructed to share the carrier frequency/phase generator 25 and the phase adjustment unit 26 with the first selector type quadrature amplitude modulation unit 24 and include a second selector unit 29 for sequentially selecting and outputting the first and second baseband digital signals and the phase-rotated first and second baseband digital signals by using the phase information from the carrier frequency/phase generator 25 as switching information and in phases different by 90° from those selected in the first selector unit 27.

The third cosine/sine information storage unit 30 receives phase information Θ(t) from the difference frequency/phase generator 15 and outputs digital cosine/sine information cos Θ(t)/sin Θ(t) equivalent to the phase information Θ(t).

The operation unit 31 multiplies the output of the first selector type quadrature amplitude modulation unit 24 by the digital cosine information cos Θ(t) from the third cosine/sine information storage unit 30, multiplies the output of the second selector type quadrature amplitude modulation unit 28 by the digital sine information sin Θ(t) from the third cosine/sine information storage unit 30 and then adds together both of these multiplying results. The operation unit 31 is constructed to include multipliers 31a and 31b and an adder 31c.

In FIG. 5, members having the same reference numerals as those of the foregoing embodiments are the same members or members having the same functions, and thus further description thereof will be omitted.

Also, in the present embodiment, the difference frequency/phase generator 15 may be replaced by a difference frequency/phase generator having Δf setting means 40 and a phase information accumulator 20 like that shown in FIG. 3.

With the above construction, processing is performed for increasing a frequency by an amount equal to a difference frequency Δf. Next, a process for frequency-converting a modulated wave will be described, and members corresponding to respective operations will also be described.

If I(t) and Q(t) are Ich and Qch signals each having a local frequency $f_{LO}$ and cos Θ(t) and sin Θ(t) are voltage waveforms each having a carrier frequency $F_{TX}$, a transmitted output RF(t) after quadrature amplitude modulation is represented by the following expression (3-1).

$$RF(t)=I(t)\times\cos\Phi(t)+Q(t)\times\sin\Phi(t) \quad (3\text{-}1)$$

Herein, if voltage waveforms equivalent to a difference Δf between the local frequency $f_{LO}$ and a baseband signal frequency $f_{BB}$ are cos Θ(t) and sin Θ(t), then a transmitted output RF(t) is represented by the following expression (3-2).

$$RF(t)=I(t)\times\cos[\Phi(t)+\Theta(t)]+Q(t)\times\sin[\Phi(t)+\Theta(t)] \quad (3\text{-}2)$$

By modifying the expression (3-2), the following expression (3-3) is obtained.

$$RF(t)=I(t)\times[\cos\Phi(t)\times\cos\Theta(t)-\sin\Phi(t)\times\sin\Theta(t)]+Q(t)\times[\sin\Phi(t)\times\cos\Theta(t)+\cos\Phi(t)\times\sin\Theta(t)]=X(t)\times\cos\Theta(t)+Y(t)\times\sin\Theta(t) \quad (3\text{-}3)$$

Herein, the codes X(t) and Y(t) are defined by the following expressions (3-4) and (3-5). The code Θ(t) is equivalent to the frequency difference Δf, and the code Φ(t) is equivalent to the carrier frequency $f_{TX}$.

$$X(t)=I(t)\times\cos\Phi(t)+Q(t)\times\sin\Phi(t) \quad (3\text{-}4)$$

$$Y(t)=Q(t)\times\cos\Phi(t)-I(t)\times\sin\Phi(t) \quad (3\text{-}5)$$

Herein, execution of the operation of the expression (3-3) by the foregoing respective members is shown in the following ① to ③.

① Operation of the Expression (3-4)

This X(t) operation is executed by the first selector unit 27. In other words, based on a selected signal outputted from the carrier frequency/phase generator 25, signals are selected one by one from the four kinds of signals I, Q, −I and −Q in sequence, and each is outputted to the rear stage.

② Operation of the Expression (3-5)

This Y(t) operation is equal to a result obtained by advancing the local signal of the expression (3-4) by 90°. In other words, Y(t) is represented by the following expression (3-6).

$$Y(t)=Q(t)\times\cos\Phi(t)-I(t)\times\sin\Phi(t)=Q(t)\times\sin\Phi(t+\pi/2)+I(t)\times\cos\Phi(t+\pi/2)=I(t)\times\cos\Phi(t+\pi/2)\times Q(t)\times\sin\Phi(t+\pi/2) \quad (3\text{-}6)$$

This Y(t) operation is executed by the second selector unit 29. In other words, based on a selected signal outputted from the carrier frequency/phase generator 25, signals are selected one by one from the four kinds of signals Q, −I, −Q and I in sequence, phases of the four signals being different by 90° from those selected in the first selector unit 27, and each signal is outputted to the rear stage.

③ Operation of the Expression (3-3)

The operation of the expression (3-3) for making additions to X(t) and Y(t) by phase rotation of a rotational angle Θ(t) is executed by the operation unit 31.

Specifically, in the multiplier 31a, X(t) outputted from the first selector unit 21 is multiplied by a cosine component cos Θ(t) outputted from the third cosine/sine information storage unit 30. In the multiplier 31b, Y(t) outputted from the second selector unit 29 is multiplied by a sine component sin Θ(t) outputted from the third cosine/sine information storage unit 30. Then, in the adder 31c, these multiplying results are added together, and then its output is transmitted from the transmission rear stage unit 19.

Thus, by using the expression (3-3), frequency conversion for a modulated wave can be facilitated. Also, since the difference frequency/phase generator 15 and the third cosine/sine information storage unit 30 are operated at low speeds, circuit cost effectiveness can be increased.

In addition, frequency conversion by an analog circuit is made unnecessary. In other words, since a frequency can be converted into a transmitted frequency coincided with system data without using a circuit for conversion into a second frequency, general applicability of the transmitting members can be promoted. Moreover, since the modulation unit can be realized by the simple selector and the circuits from the input side to the unit before the transmission rear stage 19 can be fully digitized to simplify and miniaturize a circuit configuration, the turning of the circuit into LSI can be facilitated.

(D) Fourth Embodiment

In the foregoing third embodiment, the frequency multiplication number n is 4, and the quadrature amplitude modulation unit is composed of the selector. But this portion can be replaced by another circuit.

Figure 6:
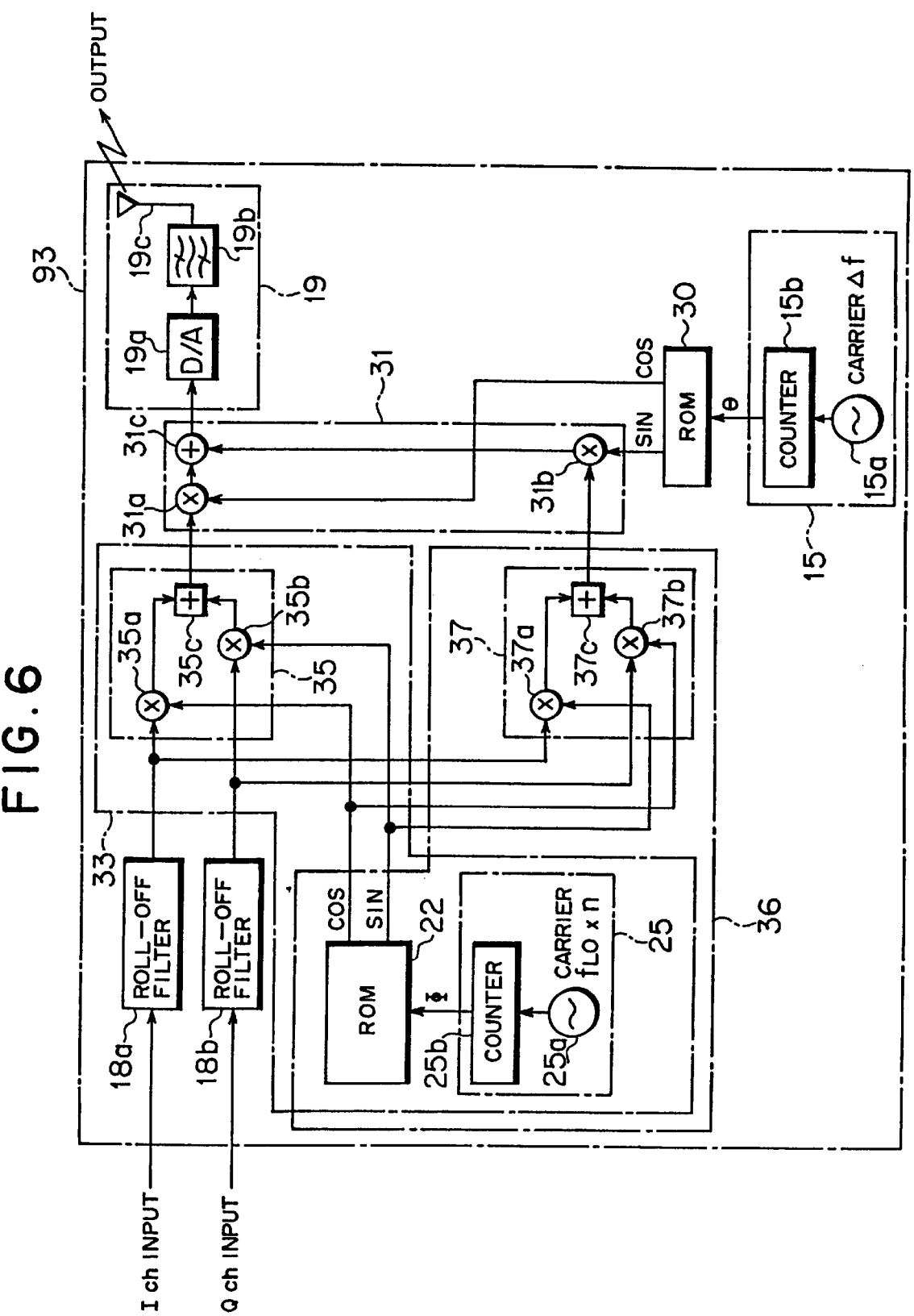
FIG. 6 is a block diagram showing a digital modulation apparatus of a fourth embodiment of the present invention.

Referring to FIG. 6, shown is a digital modulation radio transmitter of the fourth embodiment of the present invention. A digital modulation apparatus 93 shown in FIG. 6 increases a band frequency for a baseband signal without using a second carrier circuit. The digital modulation apparatus 93 comprises roll-off filters 18a and 18b, a difference frequency/phase generator 15, a third cosine/sine information storage unit 30, an operation unit 31, a transmission rear stage unit 19, a first multiplication type quadrature amplitude modulation unit 33 and a second multiplication type quadrature amplitude modulation unit 36.

Herein, the first multiplication type quadrature amplitude modulation unit 33 performs quadrature amplitude modulation for first and second baseband digital signals. The first multiplication type quadrature amplitude modulation unit 33 is constructed to include a carrier frequency/phase generator 25, a first cosine/sine information storage unit 22 and a first operation unit 35.

The first operation unit 35 is constructed to include multipliers 35a and 35b and an adder 35c. In the multiplier 35a, the output of the roll-off filter 18a is multiplied by digital cosine information cos Φ(t) from the first cosine/sine information storage unit 22. In the multiplier 35b, the output of the roll-off filter 18b is multiplied by digital sine information sin Φ(t) from the first cosine/sine information storage unit 22. Then, in the adder 35c, both of these multiplying results are added together.

The second multiplication type quadrature amplitude modulation unit 36 performs quadrature amplitude modulation for the first and second baseband digital signals. The second multiplication type quadrature amplitude modulation unit 36 is constructed to share the carrier frequency/phase generator 25 and the first cosine/sine information storage unit 22 with the first multiplication type quadrature amplitude modulation unit 33 and include a second operation unit 37.

The second operation unit 37 multiplies the output of the roll-off filter 18a by the digital sine information sin Φ(t) from the first cosine/sine information storage unit 22, multiplies the output of the roll-off filter 18b by the digital cosine information cos Φ(t) from the first cosine/sine information storage unit 22 and then adds together both of these multiplying results. The second operation unit 37 is constructed to include multipliers 37a and 37b and an adder 37c.

Among the members shown in FIG. 6, the members having the same reference numerals as those in the foregoing embodiments are the same members or members having the same functions, and thus further description thereof will be omitted.

Also, in the present embodiment, the difference frequency/phase generator 15 may be replaced by a difference frequency/phase generator having Δf setting means 40 and a phase information accumulator 20 like that shown in FIG. 3.

Thus, the digital modulation apparatus 93 is configured to comprise the first quadrature amplitude modulation unit 33 for modulating the first and second baseband digital signals orthogonal to each other by means of digital cosine/sine information cos Φ(t)/sine Φ(t) obtained based on information regarding a carrier frequency which is n multiple (n is an integer $\geq 2$) of a local frequency, the second quadrature amplitude modulation unit 36 for modulating the first and second baseband digital signals by means of digital cosine/sine information cos Φ(t)/sin Φ(t) which are different in phases by 90° from the digital cosine/sine information cos Φ(t)/sin Φ(t) used in the first quadrature amplitude modulation unit 33, the difference frequency/phase generator 15 for outputting phase information by using information regarding a difference frequency equivalent to a difference between the local frequency and a baseband frequency, the third cosine/sine information storage unit 30 for receiving the phase information from the difference frequency/phase generator 15 and outputting digital cosine/sine information cos Θ(t)/sin Θ(t) equivalent to the phase information and the operation unit 31 for multiplying the output of the first quadrature amplitude modulation unit 33 by the digital cosine information cos Θ(t) from the third cosine/sine information storage unit 30, multiplying the output of the second quadrature amplitude modulation unit 36 by the digital sine information sin Θ(t) from the third cosine/sine information storage unit 30 and then adding together both of these multiplying results.

The difference frequency/phase generator 15 is constructed to include the frequency generator 15a for generating the difference frequency and a counter 15b for receiving the output of the frequency generator 15a and outputting phase information Θ(t).

The difference frequency/phase generator 15 may be constructed to include Δf setting means 40 for setting the difference frequency and an accumulator 20 having a multiplication unit 20a and a buffer unit 20b for temporarily storing the output of the multiplication unit 20a, the accumulator 20 being provided for multiplying information regarding the difference frequency by the output of the buffer unit 20b in the multiplication unit 20a and outputting information stored in the buffer unit 20b.

With the above construction, frequency conversion set to an optional multiplication number n (n is an integer $\geq 2$) is performed.

Specifically, the first and second baseband digital signals are processed in the roll-off filters 18a and 18b such that intersymbol interference can be reduced in the receiving side. In the first operation unit 35 included in the first multiplication type quadrature amplitude modulation unit 33, the output of the roll-off filter 18a is multiplied by digital cosine information cos Φ(t) from the first cosine/sine information storage unit 22, the output of the roll-off filter 18b is multiplied by digital sine information sin Φ(t) from the first cosine/sine information storage unit 22 and then both of these multiplying results X(t) are added together and outputted.

In the second multiplication unit 37, the output of the roll-off filter 18a is multiplied by the digital sine information sin Φ(t) from the first cosine/sine information storage unit 22, the output of the roll-off filter 18b is multiplied by the digital cosine information cos Φ(t) from the first cosine/sine information storage unit 22 and then both of these multiplying results Y(t) are added together and outputted.

Then, in the operation unit 31, the output of the first multiplication type quadrature amplitude modulation unit 33 is multiplied by digital cosine information cos Θ(t), the output of the second multiplication type quadrature amplitude modulation unit 36 is multiplied by digital sine information sin Θ(t) from the third cosine/sine information storage unit 36, and then both of these multiplying results are added together and outputted from the transmission rear stage unit 19. In other words, the operation of the expression (3-3), X(t)×cos Θ(t)+Y(t)×sin Θ(t), is performed.

Accordingly, frequency conversion for a modulated wave can be facilitate. Also, since the difference frequency/phase generator 15 and the third cosine/sine information storage unit 30 are operated at low speed, circuit cost effectiveness can be increased.

Furthermore, frequency conversion by an analog circuit is made unnecessary. In other words, since a frequency can be converted into a transmitted frequency coincided with system data without using a circuit for conversion into a second frequency, general applicability of the transmitting members can be promoted. Moreover, since the circuits from the input side to the unit before the transmission rear stage 19 can be fully digitized to simplify and miniaturize a circuit configuration, the turning of the circuit into LSI can be facilitate.

(E) Fifth Embodiment

In the foregoing first to fourth embodiments, an n multiple transmitted frequency (frequency $f_{TX}$) is obtained by performing frequency conversion based on the difference frequency Δf so as to convert the baseband signal (frequency $f_{BB}$) into the local frequency (frequency $f_{LO}$). But this local frequency has a limit value required by a sampling frequency. In other words, the sampling frequency represents a transmitted output frequency (frequency $f_{TX}$) and this $f_{TX}$ is a fixed value. In this case, for a center frequency of the local frequency $f_{LO}$, ½ of the sampling frequency is its limit value.

Accordingly, a limit value of the local frequency can be increased by increasing the sampling frequency.

Figure 7:
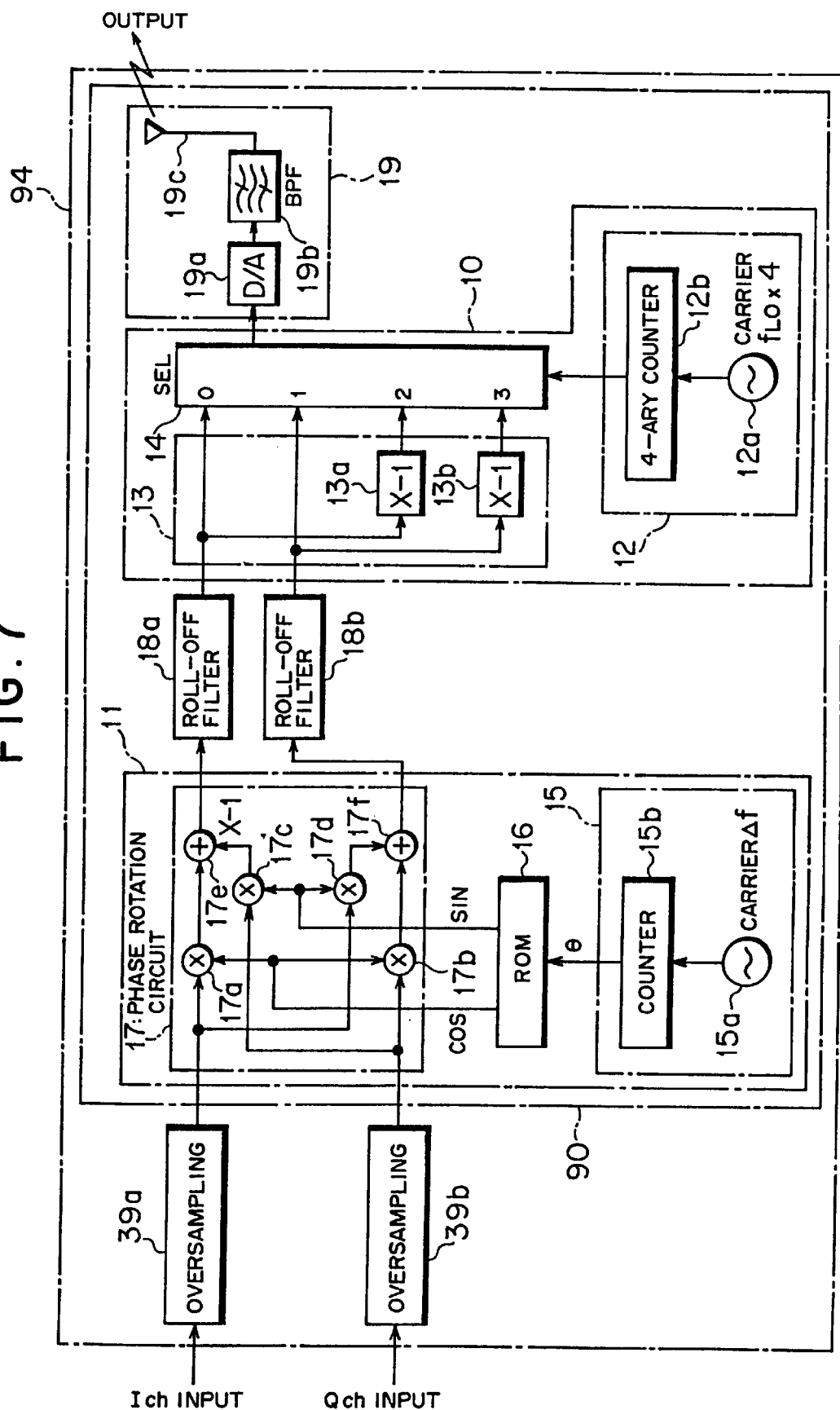
FIG. 7 is a block diagram showing a digital modulation apparatus of a fifth embodiment of the present invention.

Referring to FIG. 7, shown is a digital modulation radio transmitter of the fifth embodiment of the present invention. A digital modulation apparatus 94 shown in FIG. 7 increases a band frequency for a baseband signal without using a second carrier circuit. The digital modulation apparatus 94 comprises a digital modulator 90 and oversampling units 39a and 39b in its input side.

The oversampling units 39a and 39b are provided in the input side of a phase rotation unit 11 included in the digital modulator 90. These oversampling units 39a and 39b perform oversampling for first and second baseband digital signals.

Figure 8:
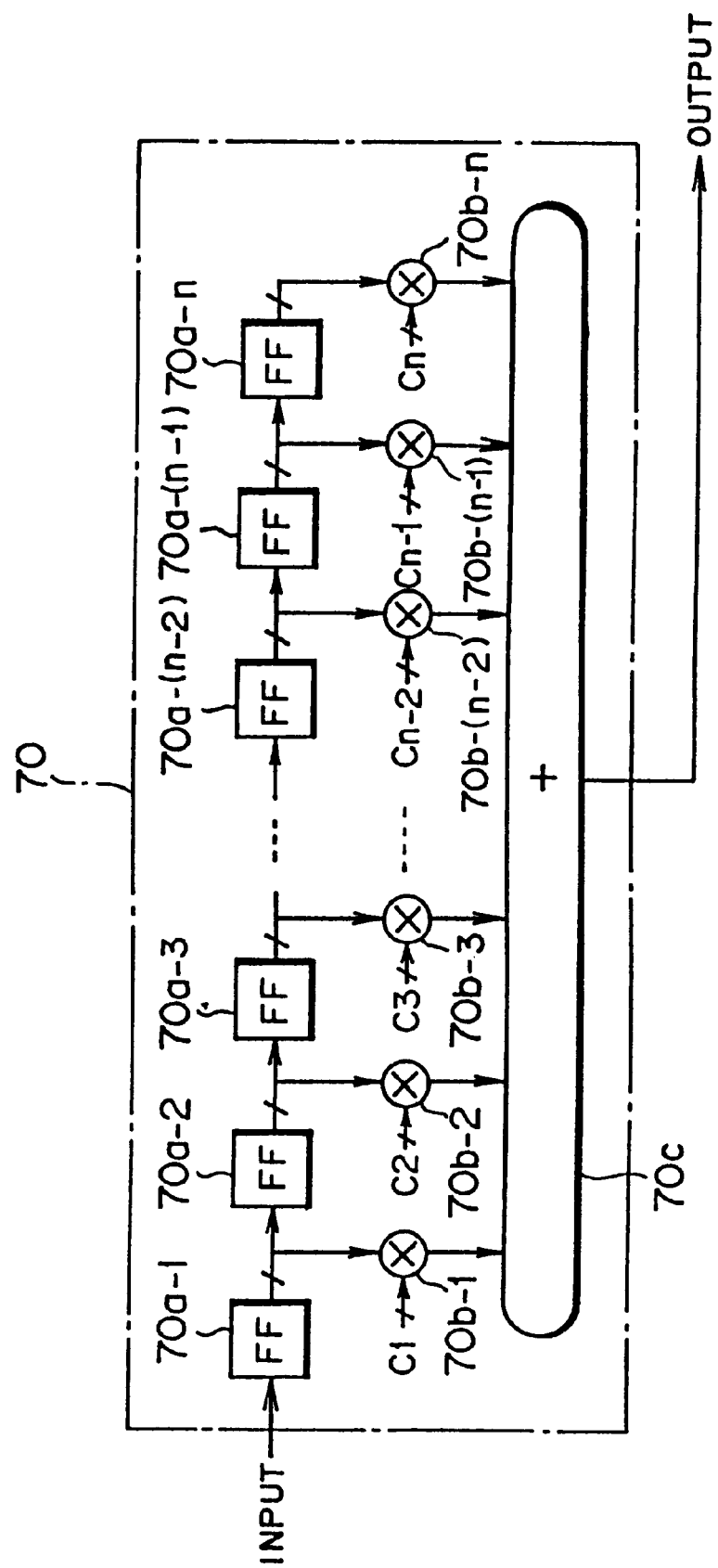
FIG. 8 is a block diagram showing an oversampling unit composed of an FIR filter.

The oversampling units 39a and 39b are composed of FIR (Finite Impulse Response) filters. FIG. 8 is a block diagram showing an FIR filter. An FIR filter 70 shown in FIG. 8 makes intermediate data necessary for increasing an oversampling frequency and interpolates this intermediate data between original data. The FIR filter 70 is constructed to include FF (Flip-Flop) 70a-1 to 70a-n connected in an n-stage column (n is a natural number), n pieces of multipliers 70b-1 to 70b-n for multiplying tap outputs from the respective flip-flops with tap coefficients $C_n$ (n is a natural number) and an adder 70c for adding together all the outputs of the multipliers.

Herein, the stage number of FF $70a$-1 to $70a$-n corresponds to an n multiple oversampling frequency. For example, in the case of normal sampling, the same values are included for every two stages in n stages. But in the case of double sampling, independent values are placed in all the flip-flops of n stages.

Tap coefficients $C_1$ to $C_n$ are used for calculating filter waveforms. An impulse response value for an old sampling frequency can be used as one example. This impulse response value h(t) is represented as follows with the old sampling frequency set to $f_0$.

$h(t)=2f_0\cdot\sin(2\pi f_0 t)/2\pi f_0 t$

The tap coefficients $C_1$ to $C_n$ can take any values other than the above as long as they have frequency transmission characteristics where values become 0 at the old sampling time and little influence is given to modulated waves.

The above oversampling units $39a$ and $39b$ may be configured as circuits composed of other FIR filters.

Figure 9:
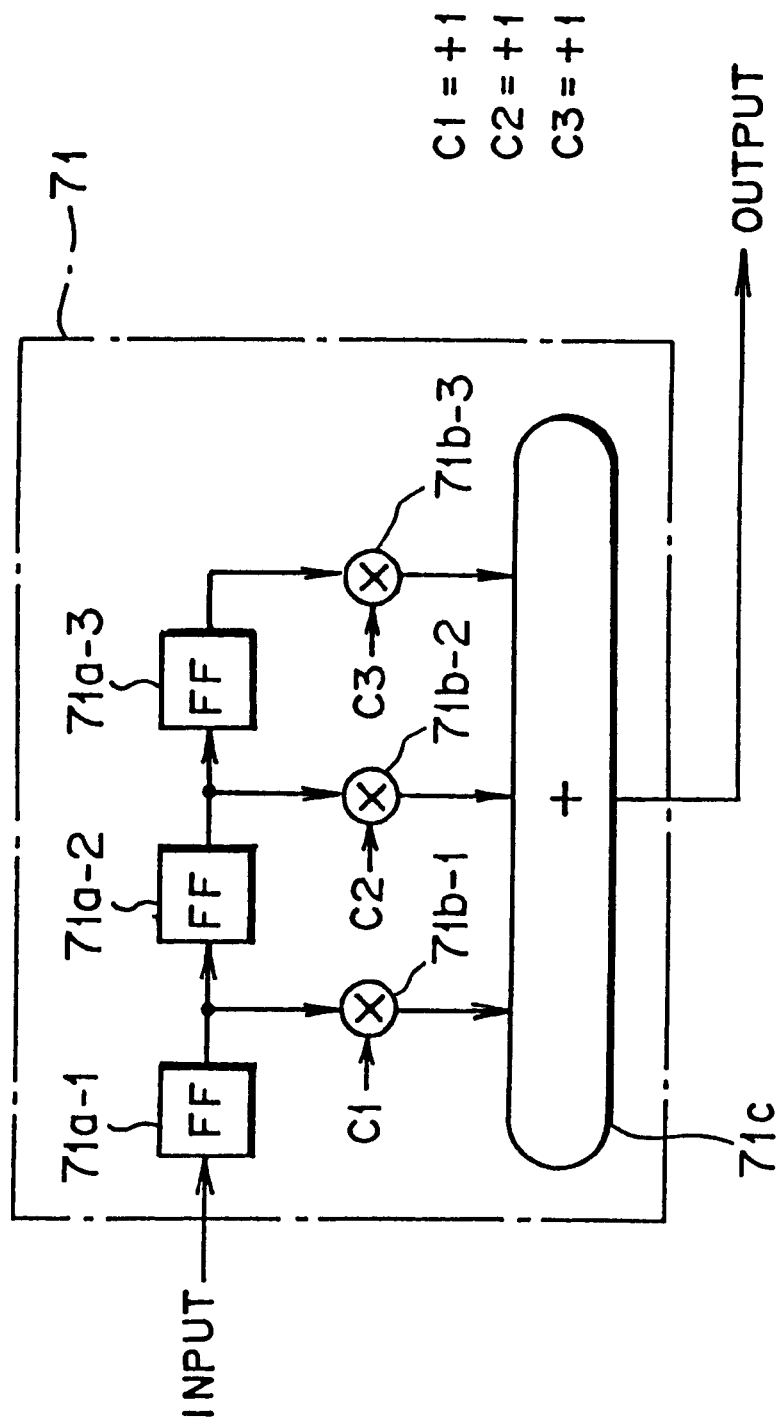
FIG. 9 is a block diagram showing an oversampling unit composed of a linear interpolation circuit.

Referring to FIG. 9, shown is an example of a linear interpolation circuit composed of an FIR filter where an oversampling multiple number is 2 and a tap number is 3. The linear interpolation circuit 71 shown in FIG. 9 makes a center value from previous and subsequent old sampling values by using a method generally called linear interpolation. The linear interpolation circuit 71 is configured to include FF (Flip-Flop) $71a$-1, $71a$-2 and 71-3, multipliers $71b$-1, $71b$-2 and $71b$-3 for multiplying outputs from the respective flip-flops by tap coefficients $C_1$, $C_2$ and $C_3$ and an adder $71c$ for adding together all the outputs of the multiplies.

By providing this linear interpolation circuit 71, a center value can be made from previous and subsequent old sampling values.

Roll-off filters $18a$ and $18b$ shown in FIG. 7 can be arranged in the front stage of the oversampling units $39a$ and $39b$.

Among the members shown in FIG. 7, the members having the same reference numerals as those of the foregoing embodiments are the same members or members having the same functions, and thus further description thereof will be omitted.

Also, in the present embodiment, a difference frequency/phase generator 15 may be replaced by a difference frequency/phase generator having $\Delta f$ setting means 40 and a phase information accumulator 20 like that shown in FIG. 3.

With the above configuration, a local frequency (frequency $f_{LO}$) can be increased. The capability of increasing the local frequency will be described next based on a sampling theorem.

Figure 10A:
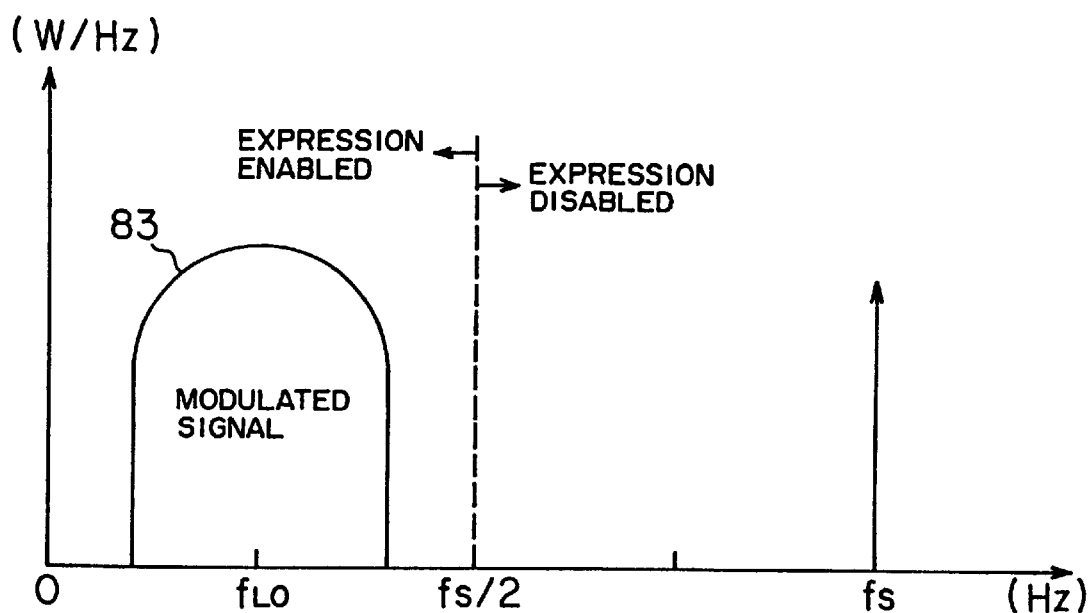
FIG. 10(a) is a view showing a case where a signal band is in a range for being accurately expressed based on a sampling theorem.

Referring to FIG. 10(a), shown is a relationship between a local frequency (frequency $f_{LO}$) and a sampling frequency (frequency $f_s$). In FIG. 10(a), an abscissa represents a frequency (Hz), and an ordinate represents a power spectrum density (W/Hz). A local frequency spectrum 83 appears around a frequency $f_{LO}$, and its highest frequency value is within a frequency $f_s/2$. Accordingly, signal data can be accurately expressed. In other words, according to the sampling theorem, a smallest sampling frequency $f_s$(Hz) for sampling a signal must be double or higher than a highest effective frequency W(Hz) contained in the signal. If sampling is performed with a frequency lower than 2W(Hz), the spectrum of the sampled signal is superimposed as a ghost in the region of an original signal spectrum. Consequently, specified aliasing occurs. In other words, a limit of frequencies to be accurately expressed is a frequency $f_s/2$ (Hz) with respect to a sampling frequency $f_s$(Hz), and frequencies exceeding the frequency $f_s/2$ (Hz) cannot be expressed.

Herein, the sampling frequency $f_s$ is a value required based on a hardware sampling rate. For example, if a transmitted frequency is 4 multiple of a local frequency $f_{LO}$, the following relationship is established.

$f_s=4\times f_{LO}$

Figure 10B:
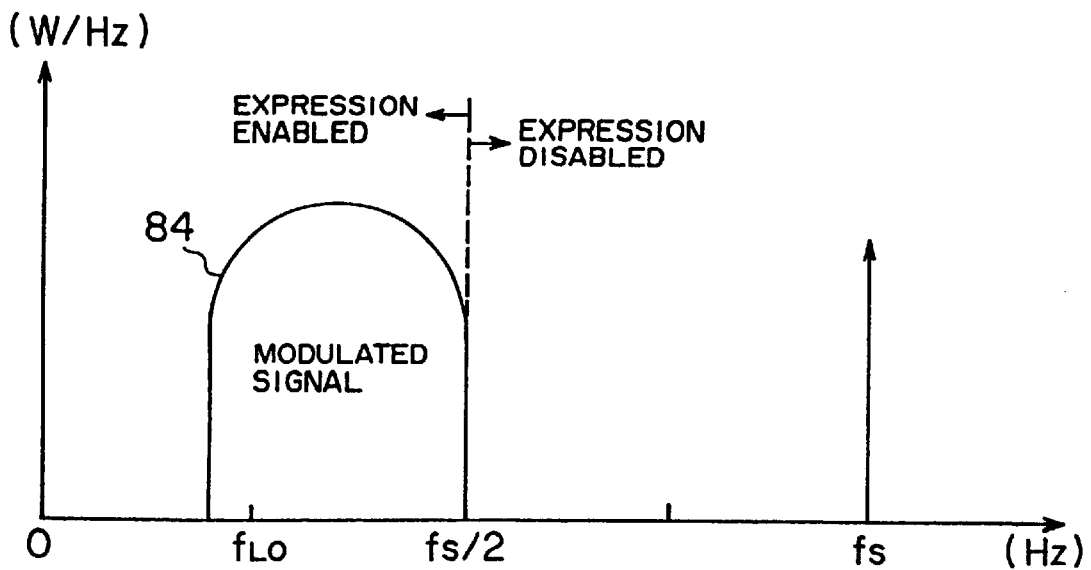
FIG. 10(b) is a view showing a case where a highest frequency is changed to be one of a limit height based on the sampling theorem.

Referring now to FIG. 10(b), shown is the case where a highest frequency value has reached a limit point. A local frequency spectrum 84 shown in FIG. 10(b) corresponds to the case of a limit where a further frequency increase will lead to the occurrence of aliasing to a low frequency side.

Figure 11:
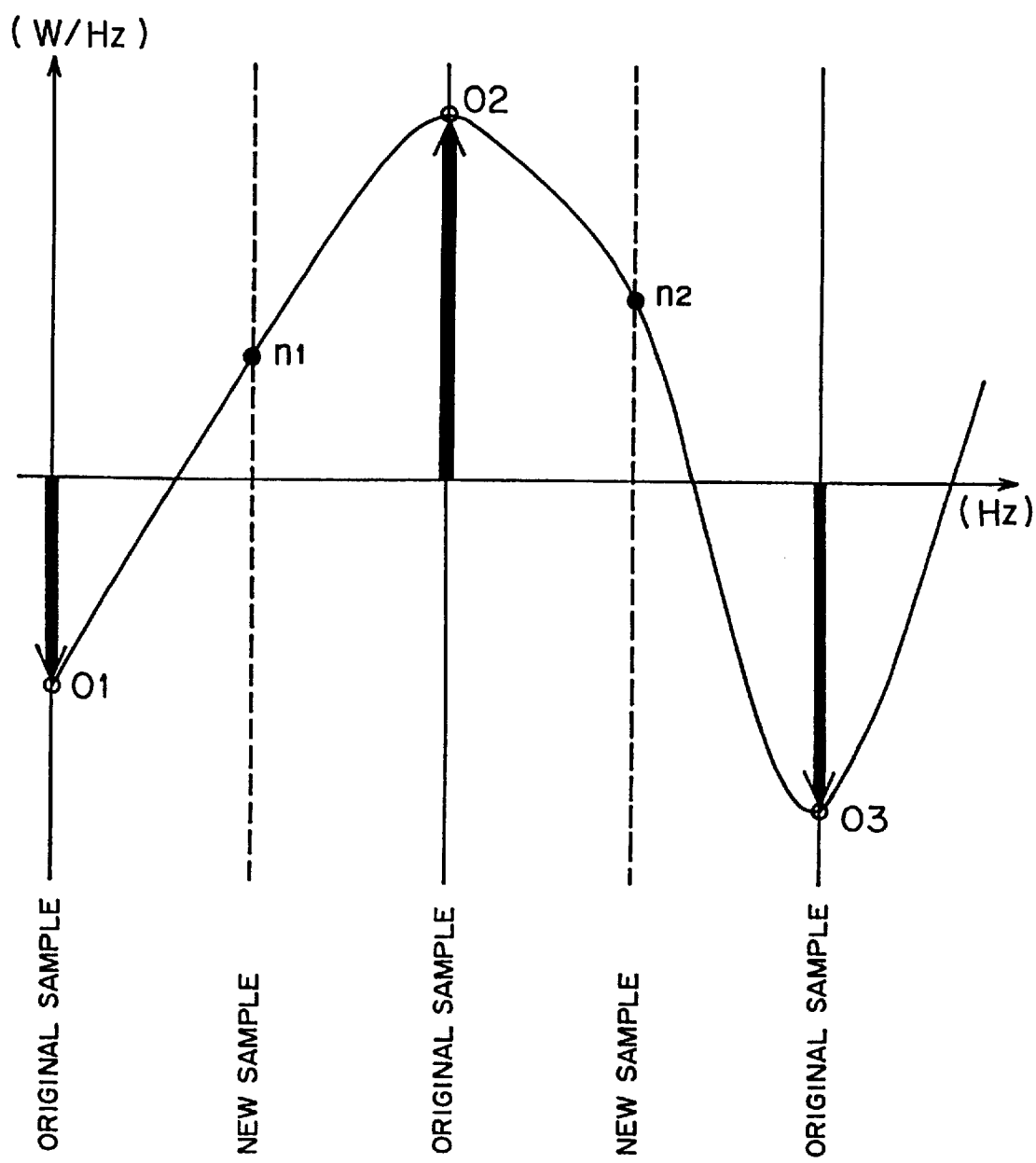
FIG. 11 is a view illustrating interpolation of a sample value between impulse response values.

Herein, by using the FIR filter 70, the sampling frequency $f_s$ can be increased and the local frequency $f_{LO}$ can be increased more than an original limit value. In other words, for performing double oversampling, intermediate data is made and interpolated as in the case of a signal waveform shown in FIG. 11.

Specifically, in FIG. 11, 01, 02 and 03 of ○ marks represent original sampling signal positions, and arrow values represent digital values. For interpolation, n1 and n2 signals of ● marks are made from a line indicating the transition of signal waveforms. In other words, for values of new sampling points n1, n2, . . . , weight of each impulse response is added by considering the old sampling points 01, 02 and 03 indicated by the arrows as impulses.

Thus, since sampling points are increased by making and interpolating intermediate data rather than using continuous data on the increased sampling frequencies, the sampling frequency $f_s$ can be increased so as to increase the local frequency $f_{LO}$ more than the original limit point.

Figure 12:
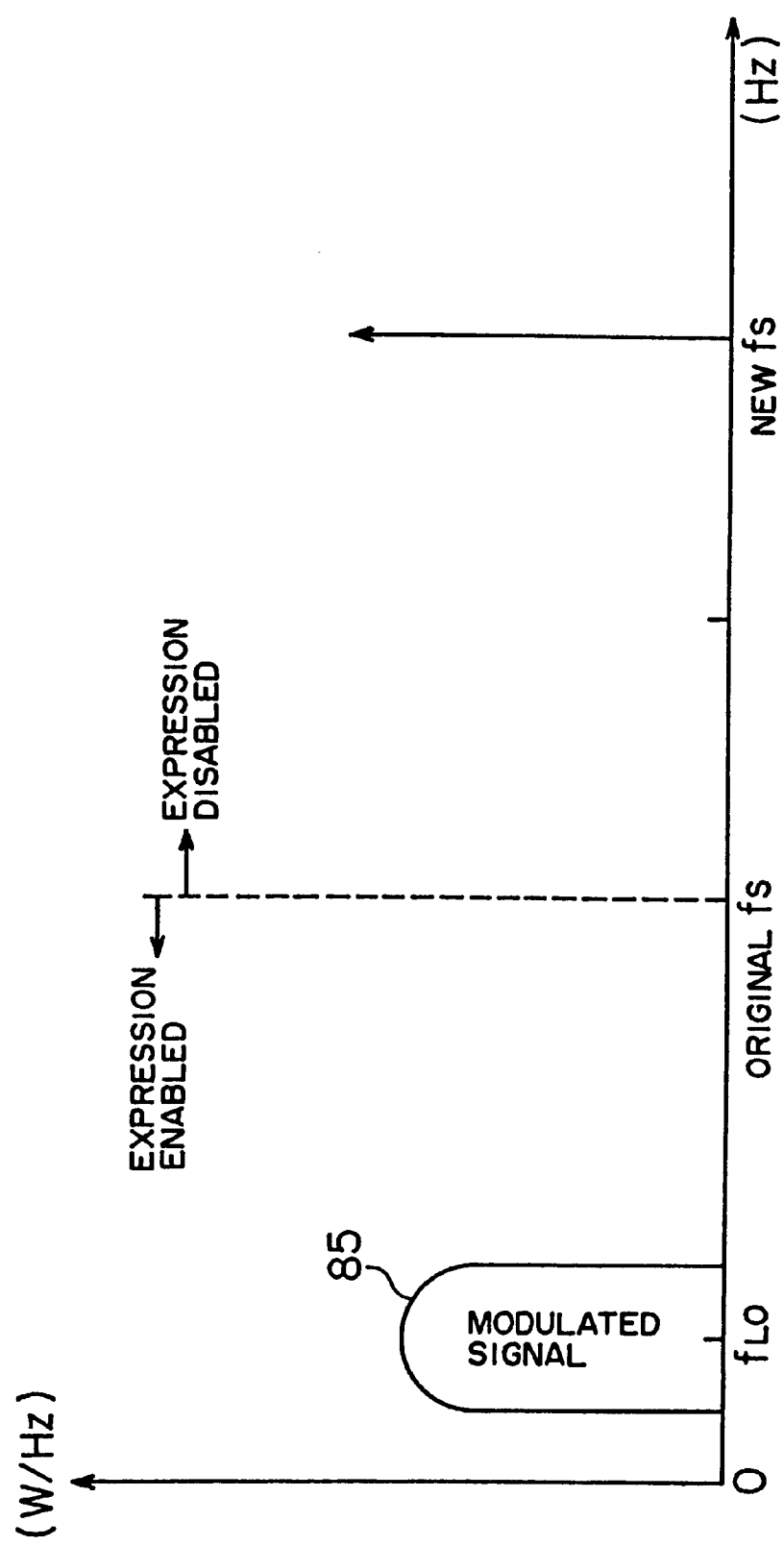
FIG. 12 is a view showing a relationship between a modulated wave and a frequency when a sampling frequency is increased.

Referring now to FIG. 12, shown is a relationship between a modulated wave and a frequency when the frequency $f_s$ is increased twice as much as the size of the original frequency. As shown in FIG. 12, since a sampling speed is doubled, a local frequency spectrum 85 can be increased twice as much as the original frequency (original frequency $f_s$).

Thus, with the special structure of the FIR filter, the circuit can be simplified. Also, the possibility of selecting this circuit can be decided according to the required accuracy of quadrature amplitude modulation. Then, even if a transmitted frequency equal to the sampling frequency $f_s$ has been decided in both of the frequency outputted from the phase rotation unit 11 and the frequency outputted from the third cosine/sine information storage unit 30, by making and interpolating intermediate data, a highest frequency value contained in the spectrum can be increased from $f_s/2$ to $f_s$ and, accordingly, the local frequency $f_{LO}$ can be increased more than the original limit value.

Furthermore, since a frequency can be converted into a transmitted frequency coincided with system data without using an analog circuit for conversion into a second frequency, general applicability of the transmitting members can be promoted. Also, since the modulation unit can be realized by the simple selector and the circuit can be fully digitized to simplify and miniaturize a circuit configuration, the turning of the circuit into LSI can be facilitated. Moreover, since the frequency of the difference frequency generator $15a$ is moved at a low speed of $\Delta f$, circuit cost effectiveness can be increased.

(F) Sixth Embodiment

In the foregoing second embodiment, the oversampling number is 1. But an oversampling circuit of 2 or more can be inserted into the front stage of the input section.

Figure 13:
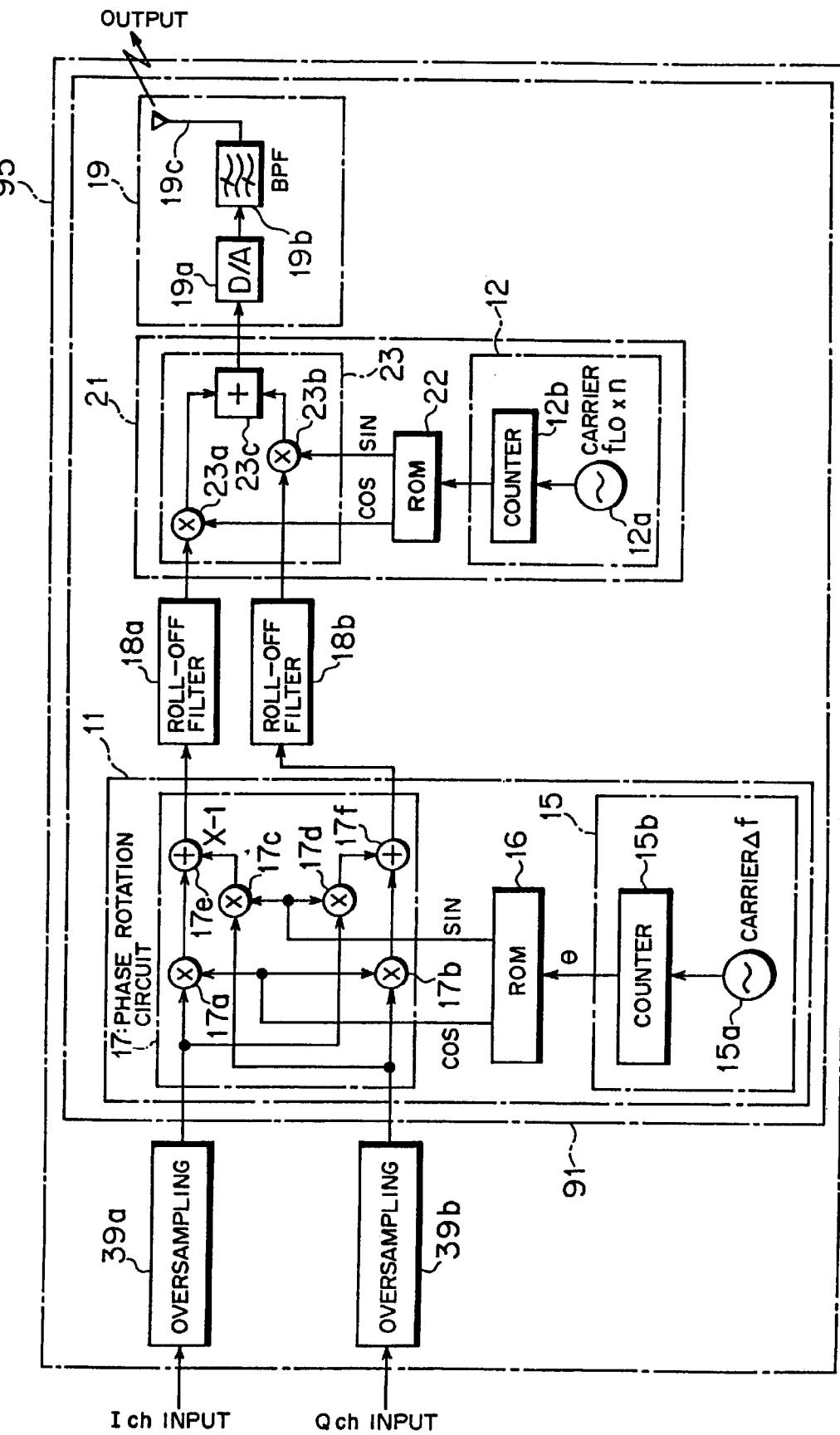
FIG. 13 is a block diagram showing a digital modulation apparatus of a sixth embodiment of the present invention.

Referring to FIG. 13, shown is a digital modulation radio transmitter of the sixth embodiment of the present invention.

A digital modulation apparatus 95 shown in FIG. 13 increases a band frequency for a baseband signal without using a second carrier circuit. The digital modulation apparatus 95 comprises a digital modulator 91 and oversampling units 39a and 39b provided in its input side. The oversampling units 39a and 39b are constructed to include the FIR filter shown in FIG. 8 and the linear interpolation circuit shown in FIG. 9 respectively.

The oversampling units 39a and 39b can be arranged respectively after roll-off filters 18a and 18b.

Among the members shown in FIG. 13, the members having the same reference numerals as those of the foregoing embodiments are the same members or members having the same functions, and thus further description thereof will be omitted.

Also, in the present embodiment, a difference frequency/phase generator 15 may be replaced by a difference frequency/phase generator having Δf setting means 40 and a phase information accumulator 20 like that shown in FIG. 3.

With the above construction, an inputted first baseband digital signal is subjected to oversampling in the oversampling unit 39a. A second baseband digital signal is subjected to oversampling in the oversampling unit 39b. Then, these signals are outputted to a phase rotation unit 11 included in the digital modulator 91.

The inputted first and second baseband digital signals are subjected to phase rotation in the phase rotation unit 11. Then, in the roll-off filters 18a and 18b, the first and second baseband digital signals are processed such that intersymbol interference can be reduced to a minimum in the receiving side, and then inputted to a multiplication type quadrature amplitude modulation unit 21.

Then, in the multiplication type quadrature amplitude modulation unit 21, the first and second baseband digital signals orthogonal to each other are modulated by means of digital cosine/sine information obtained based on information regarding a carrier frequency which is n multiple (n is an integer ≧2) of a local frequency and then transmitted from a transmission rear stage 19 to a radio channel.

Accordingly, since a sampling frequency $f_s$ can be increased to increase a local frequency $f_{LO}$ more than an original limit value and a frequency can be converted into a transmitted frequency coincided with system data without using an analog circuit for conversion into a second frequency, general applicability of the transmitting members can be promoted. Also, since the circuit can be fully digitized to simplify and miniaturize a circuit configuration, the turning of the circuit into LSI can be facilitated and high accuracy and high cost effectiveness can be promoted. Moreover, since a difference frequency Δf is moved at a low speed, circuit cost effectiveness can be increased.

(G) Seventh Embodiment

In the foregoing third embodiment, the oversampling number is 1. But an oversampling of 2 or more can be inserted into the front stage of an input section.

Figure 14:
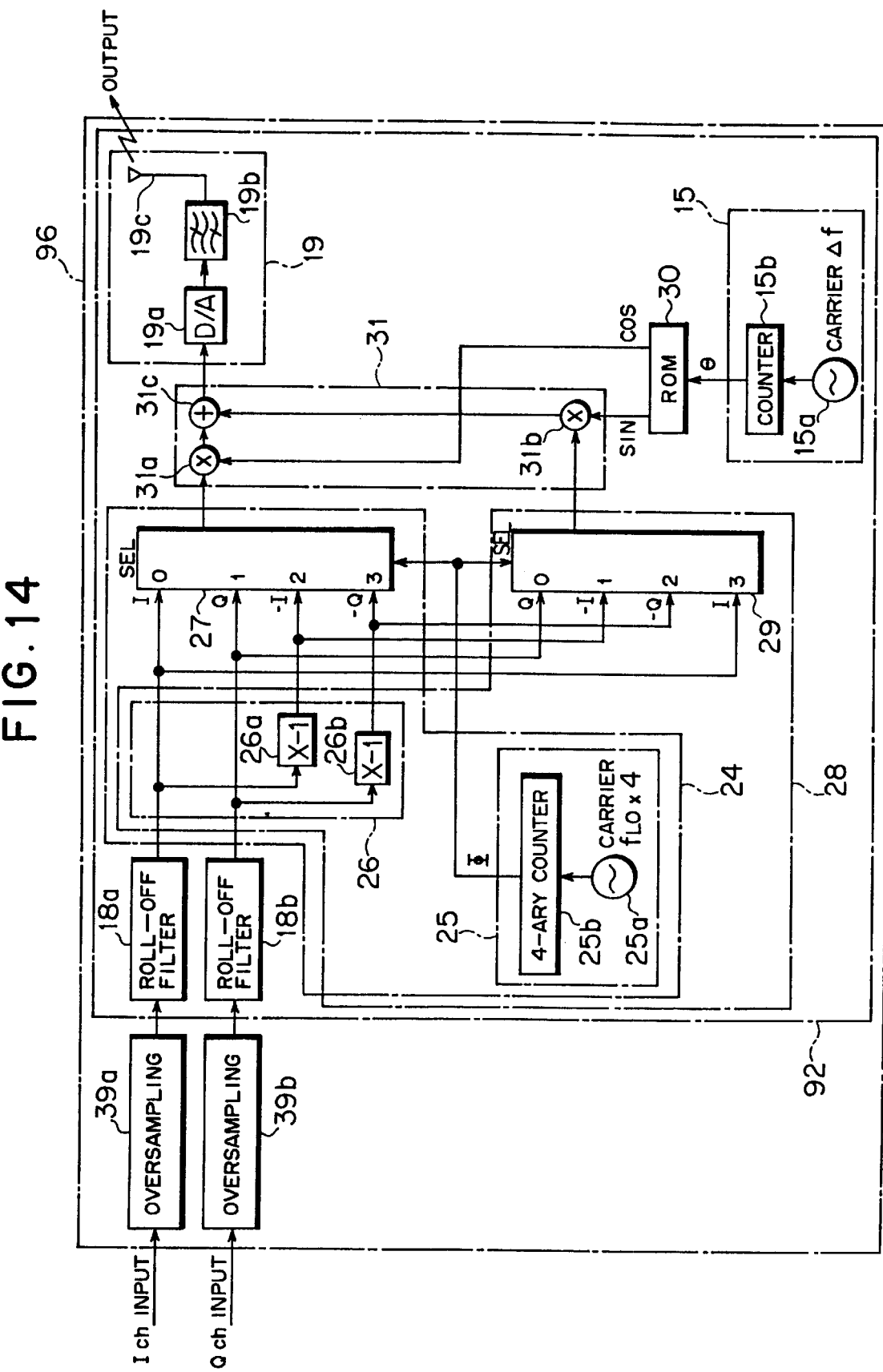
FIG. 14 is a block diagram showing a digital modulation apparatus of a seventh embodiment of the present invention.

Referring to FIG. 14, shown is a digital modulation radio transmitter of the seventh embodiment of the present invention. A digital modulation apparatus 96 shown in FIG. 14 increases a band frequency for a baseband signal without using a second carrier circuit. The digital modulation apparatus 96 comprises a digital modulator 92 and oversampling units 39a and 39b in its input side. The oversampling unit 39a and 39b are constructed to include the FIR filter shown in FIG. 8 and the linear interpolation circuit shown in FIG. 9 respectively.

The oversampling units 39a and 39b can be arranged respectively after roll-off filters 18a and 18b.

Among the members shown in FIG. 14, the members having the same reference numerals as those of the foregoing embodiments are the same members or members having the same functions, and thus further description thereof will be omitted.

Also, in the present embodiment, a difference frequency/phase generator 15 may be replaced by a difference frequency/phase generator having Δf setting means 40 and a phase information accumulator 20 like that shown in FIG. 3.

With the above construction, an inputted first baseband digital signal is subjected to oversampling in the oversampling unit 39a and outputted to the digital modulator 92. A second baseband digital signal is subjected to oversampling in the oversampling unit 39b and outputted to the digital modulator 92. These first and second baseband digital signals are processed in the roll-off filters 18a and 18b such that intersymbol interference can be eliminated in the receiving side.

Then, in a phase adjustment unit 26 included in a first selector type quadrature amplitude modulation unit 24, the first baseband digital signal is branched into two parts. One part of the branched first baseband digital signal is inputted to first and second selector units 27 and 29, respectively. The other part of the branched first baseband digital signal is phase-rotated by π in a phase adjuster 26a and then inputted to the first and second selector units 27 and 29, respectively.

In the phase adjustment unit 26, the second baseband digital signal is also branched into two signals. One part of the branched second baseband digital signal is inputted to the first and second selector units 27 and 29, respectively. The other part of the branched second baseband digital signal is phase-rotated by π in a phase adjuster 26b and then inputted to the first and second selector units 27 and 29, respectively.

Then, in the first selector unit 27 included in the first selector type quadrature amplitude modulation unit 24, the four signals including these first and second baseband digital signals and the phase-rotated first and second baseband digital signals from the phase adjustment unit 26 are sequentially selected and outputted by using, as switching information, phase information outputted from a carrier frequency/phase generator 25 using information regarding a carrier frequency.

Also, in the second selector unit 29 included in a second selector type quadrature amplitude modulation unit 28, the four signals are sequentially selected and outputted by using, as switching information, the phase information outputted from the shared carrier frequency/phase generator 25 in the first selector type quadrature amplitude modulation unit 24.

Then, in an operation unit 31, the output of the first selector type quadrature amplitude modulation unit 24 is multiplied by digital cosine information cos Θ(t) from a third cosine/sine information storage unit 30, the output of the second selector type quadrature amplitude modulation unit 28 is multiplied by digital sine information sin Θ(t) from the third cosine/sine information storage unit 30, and both of these multiplying results are added together and then outputted from a transmission rear stage unit 19.

Accordingly, since a sampling frequency $f_s$ can be increased to increase a local frequency $f_{LO}$ more than an original limit value and a frequency can be converted into a transmitted frequency coincided with system data without using an analog circuit for conversion into a second frequency, general applicability of the transmitting members can be promoted. Also, since the modulation unit can be realized by the simple selector and the circuit can be fully digitized to simplify and miniaturize a circuit configuration, the turning of the circuit into LSI can be facilitated and high accuracy and high cost effectiveness can be promoted. Moreover, since a difference frequency Δf is moved at a low speed, circuit cost effectiveness can be increased.

(H) Eighth Embodiment

In the foregoing fourth embodiment, the oversampling number is 1. But an oversampling circuit of 2 or more may be inserted into the front stage of the input section.

Figure 15:
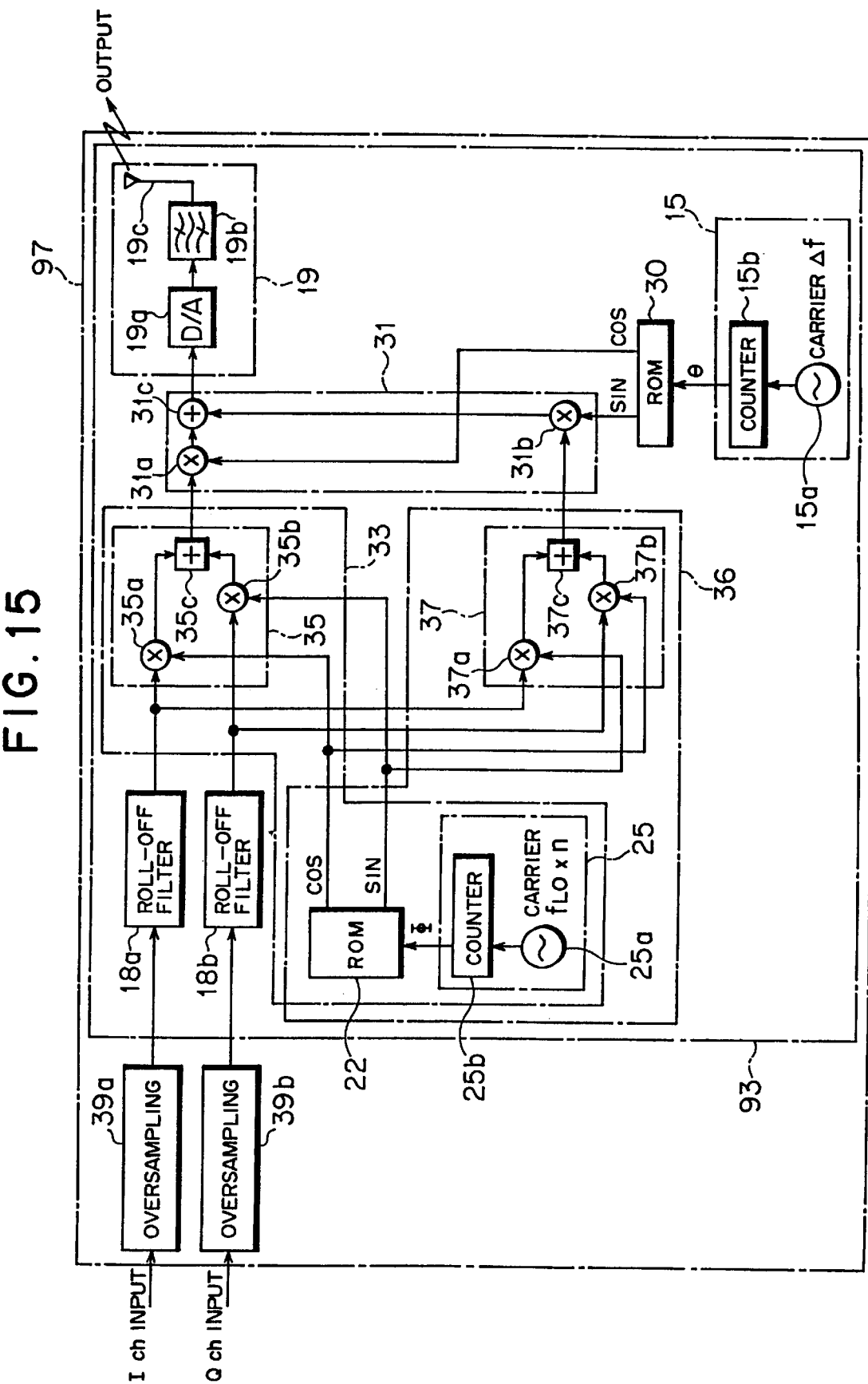
FIG. 15 is a block diagram showing a digital modulation apparatus of an eighth embodiment of the present invention.
Figure 16:
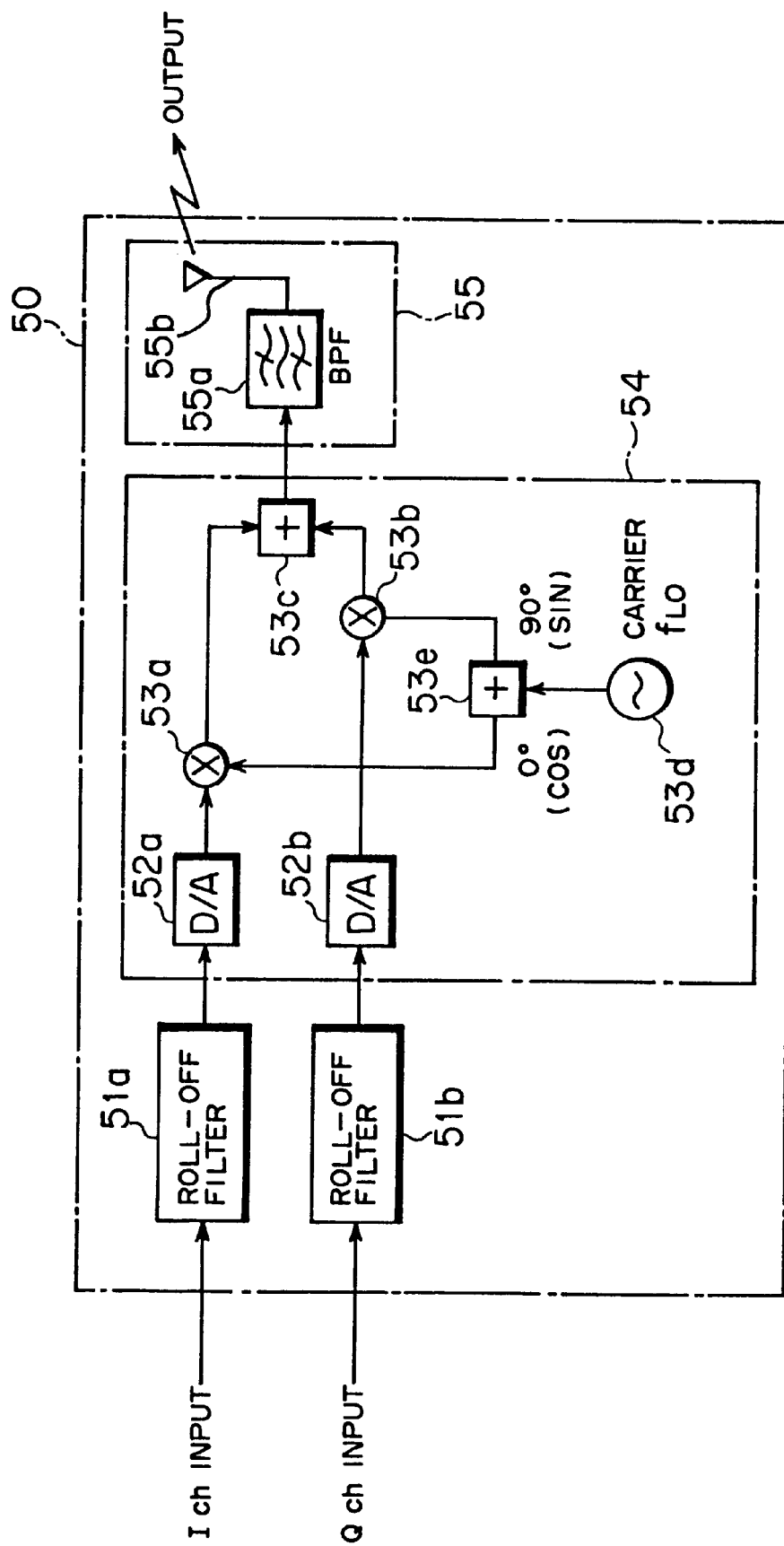
FIG. 16 is a block diagram showing a transmission unit of an analog modulation apparatus.
Figure 17:
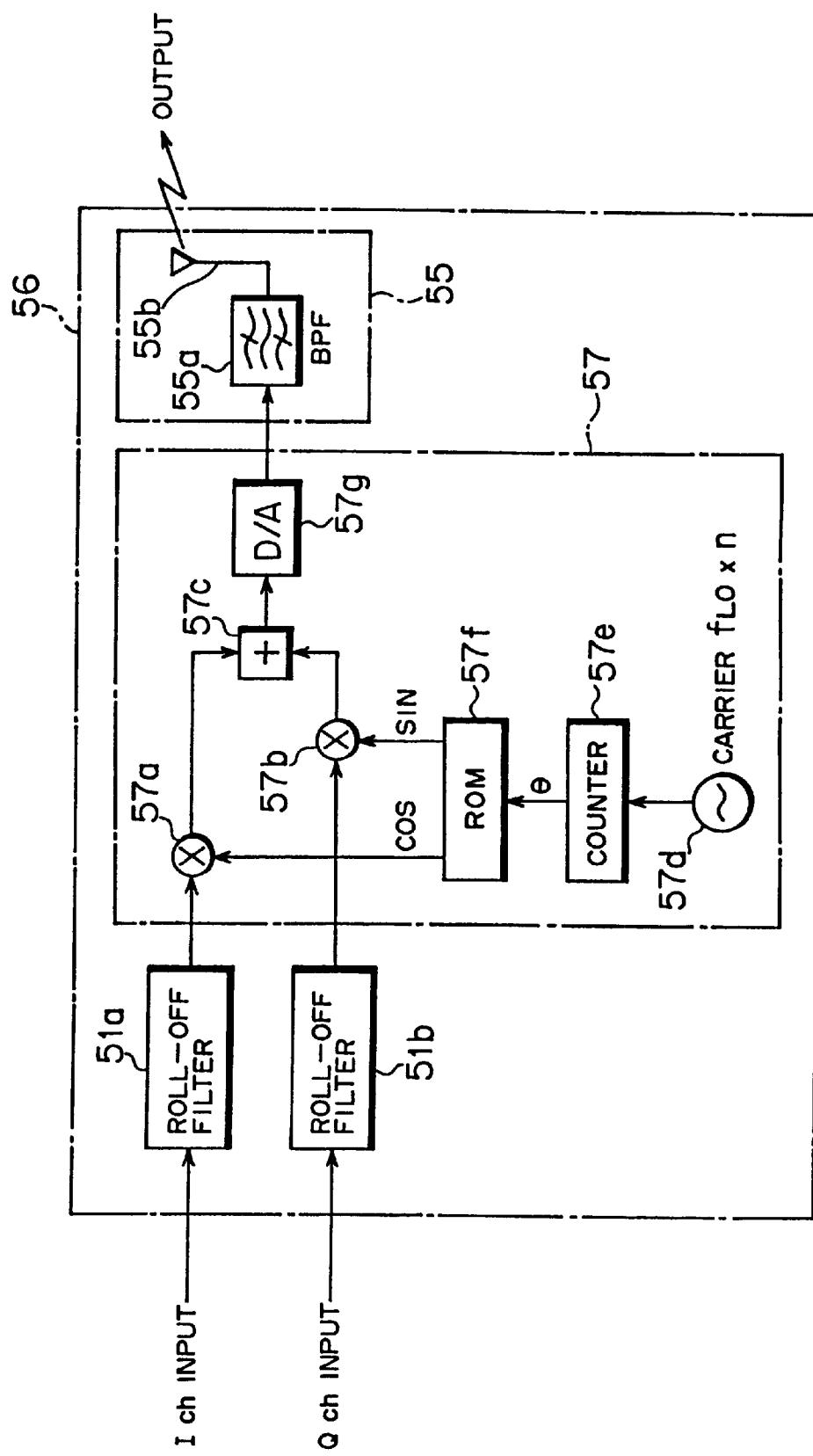
FIG. 17 is a block diagram showing a transmission unit of a digital modulation apparatus.
Figure 18:
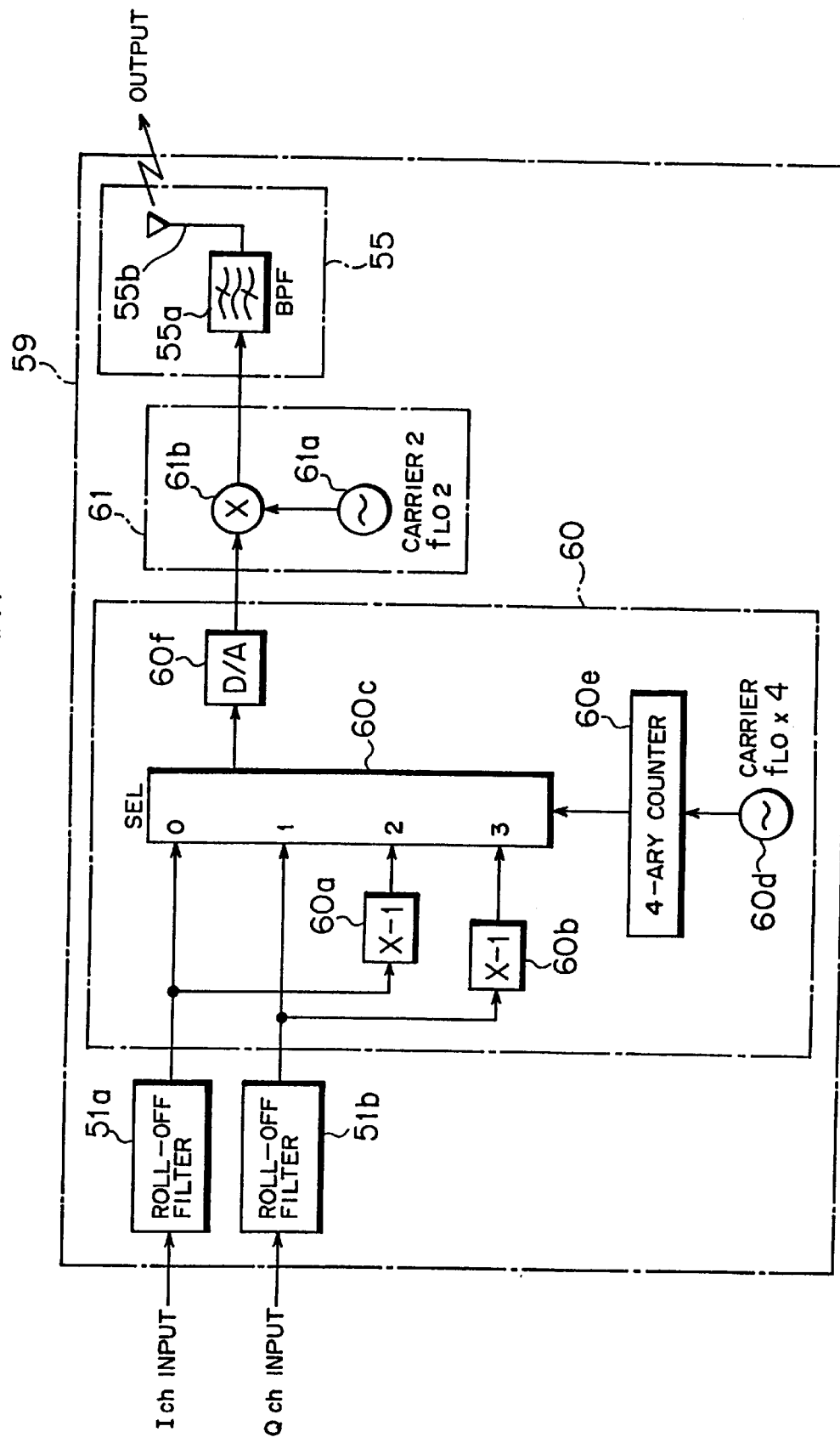
FIG. 18 is a block diagram showing a transmission unit of a digital modulation apparatus using a selector.
Figure 19:
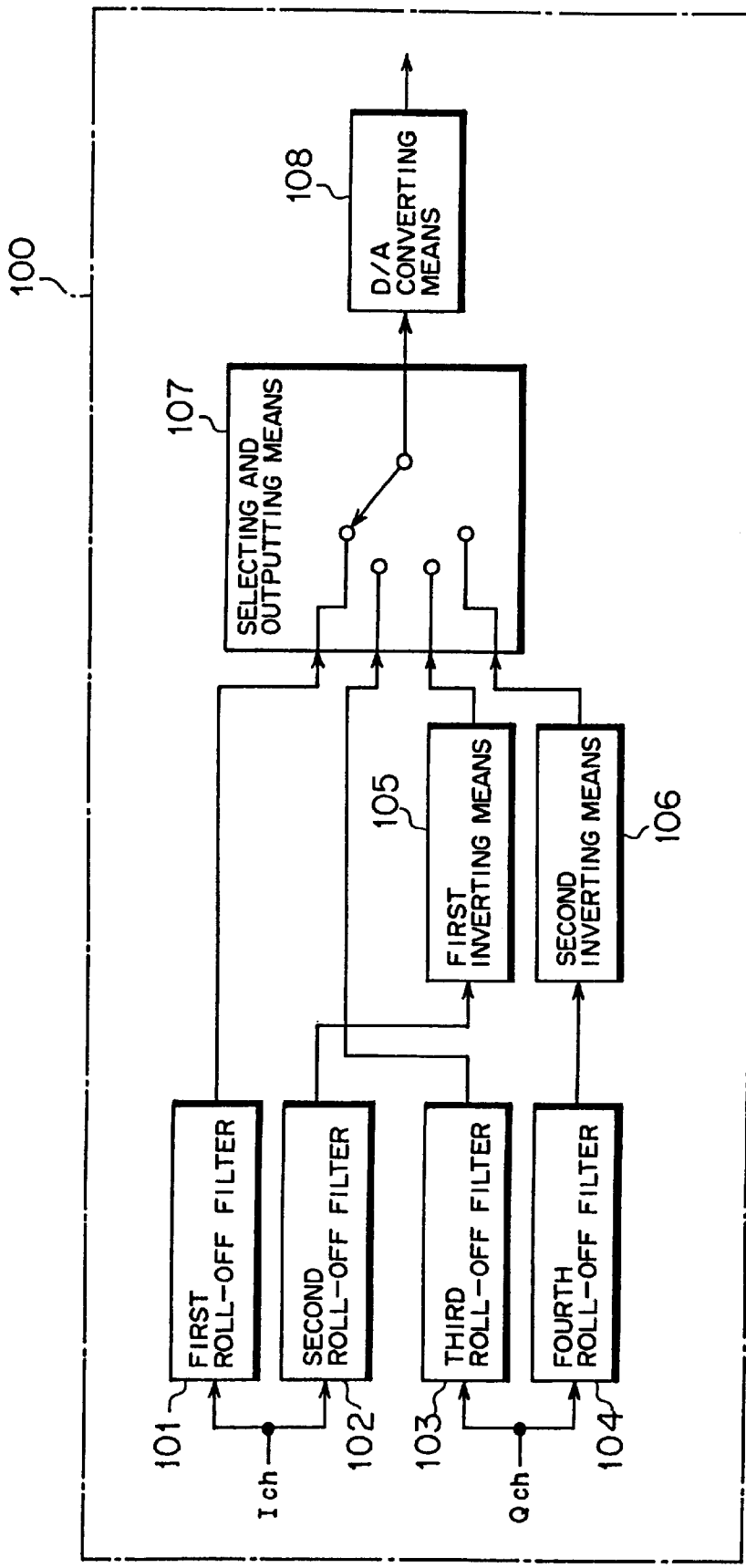
FIG. 19 is a block diagram showing a transmission unit of a digital modulation apparatus using another separator.

Referring to FIG. 15, shown is a digital radio transmitter of the eighth embodiment of the present invention. A digital modulation apparatus 97 shown in FIG. 15 increases a band frequency for a baseband signal without using a second carrier circuit. The digital modulation apparatus 97 comprises a digital modulator 93 and oversampling units 39a and 39b. The oversampling units 39a and 39b are constructed to include an FIR filter and a linear interpolation circuit like those described above.

In FIG. 15, the oversampling units 39a and 39b can be arranged after roll-off filters 18a and 18b.

Among the members in FIG. 15, the members having the same reference numerals as those of the foregoing embodiments are the same members or members having the same function, and thus further description thereof will be omitted.

Also, in the present embodiment, a difference frequency/phase generator 15 may be replaced by a difference frequency/phase generator having Δf setting means 40 and a phase information accumulator 20 like that shown in FIG. 3.

In other words, the oversampling units 39a and 39b for performing oversampling for first and second baseband digital signals are provided respectively in the input sides of first and second quadrature amplitude modulation units 33 and 36.

The oversampling units 39a and 39b are constructed to include an FIR filter 70 and a linear interpolation circuit 71.

With the above construction, frequency conversion based on an optional multiplication number n (n is an integer ≧2). Specifically, the inputted first baseband digital signal is subjected to oversampling in the oversampling unit 39a and outputted to the digital modulator 93. The second baseband digital signal is subjected to oversampling in the oversampling unit 39b and outputted to the digital modulator 93. These first and second baseband digital signals are then processed in the roll-off filters 18a and 18b such that intersymbol interference can be eliminated in the receiving side.

Then, in a first operation unit 35 included in the first multiplication type quadrature amplitude modulation unit 33, the output of the roll-off filter 18a is multiplied by digital cosine information cos Φ(t) from a first cosine/sine information storage unit 22. The output of the roll-off filter 18b is multiplied by sine information sin Φ(t) from the first cosine/sine information storage unit 22. Then, both of these multiplying results are added together and outputted from the transmission rear stage unit 19.

Also, in a second operation unit 37 included in the second multiplication type quadrature amplitude modulation unit 36, the output of the roll-off filter 18a is multiplied by the digital sine information sin Φ(t) from the shared first cosine/sine information storage unit 22. The output of the roll-off filter 18b is multiplied by the digital cosine information cos Φ(t) from the shared first cosine/sine information storage unit 22. Both of these multiplying results are added together and outputted.

Then, in an operation unit 31, the output of the first multiplication type quadrature amplitude modulation unit 33 is multiplied by digital cosine information cos Θ(t) from a third cosine/sine information storage unit 30. The output of the second multiplication quadrature amplitude modulation unit 36 is multiplied by digital sine information sin Θ(t) from the third cosine/sine information storage unit 30. Then, both of these multiplying results are added together and outputted.

Accordingly, since a high sampling frequency $f_s$ can be provided to increase a local frequency $f_{LO}$ more than an original limit value and a frequency can be converted into a transmitted frequency coincided with system data without using an analog circuit for conversion into a second frequency, general applicability of the transmitting members can be promoted. Also, since the circuit can be fully digitized to simplify and miniaturize a circuit configuration, the turning of the circuit into LSI can be facilitated and high accuracy and high cost effectiveness can be promoted. Moreover, since a difference frequency Δf is moved at a low speed, circuit cost effectiveness can be promoted.

(I) Others

It should be understood that the present invention is not limited to the foregoing embodiments. For example, in each of the foregoing embodiments, the present invention may be applied for an apparatus having a transmission amplifier provided in the front stage of the band-pass filter 19b in the transmission rear stage unit 19.

In the fifth to eighth embodiments, the oversampling units are composed of FIR filters and linear interpolation circuits. But the present invention imposes no limitation on this, and other means may be used for composing the oversampling units. Also, interposing positions of the oversampling units can be selected between the phase rotation unit 11 and the roll-off filters 18a and 18b.

It should also be understood that irrespective of the foregoing embodiments, various changes and modifications can be made without departing from the spirit and scope of the present invention.

What is claimed is:

1. A digital modulation apparatus comprising:
 a quadrature amplitude modulation unit for modulating first and second baseband digital signals orthogonal to each other by means of digital cosine/sine information obtained based on information regarding a carrier frequency which is n multiple (n is an integer ≧2) of a local frequency; and
 a phase rotation unit provided in an input side of said quadrature amplitude modulation unit for performing phase rotation for said first and second baseband digital signals by using a difference frequency equivalent to a difference between said local frequency and a baseband frequency.

2. A digital modulation apparatus as claimed in claim 1, wherein said quadrature amplitude modulation unit is constructed to include a carrier frequency/phase generator for outputting phase information by using information regarding said carrier frequency, a first cosine/sine information storage unit for receiving said phase information from said carrier frequency/phase generator and outputting digital cosine/sine information equivalent to said phase information and an operation unit for multiplying said digital cosine information from said first cosine/sine information storage unit by said first baseband digital signal, multiplying said digital sine information from said first cosine/sine information storage unit by said second baseband digital signal and adding together both of these multiplying results.

3. A digital modulation apparatus as claimed in claim 1, wherein said quadrature amplitude modulation unit is constructed to include a carrier frequency/phase generator for outputting phase information by using information regarding said carrier frequency, a phase adjustment unit for branching said first and second baseband digital signals respectively into required numbers and performing phase rotation for said branched first and second baseband digital signals respectively and a selector unit for sequentially selecting and outputting said first and second baseband digital signals and said phase-rotated first and second baseband digital signals from said phase adjustment unit by using said phase information from said carrier frequency/phase generator as switching information.

4. A digital modulation apparatus as claimed in claim 2, wherein said carrier frequency/phase generator is constructed to include a frequency generator for generating said carrier frequency and a counter for receiving an output of said frequency generator and outputting said phase information.

5. A digital modulation apparatus as claimed in claim 3, wherein said carrier frequency/phase generator is constructed to include a frequency generator for generating said carrier frequency and a counter for receiving an output of said frequency generator and outputting said phase information.

6. A digital modulation apparatus as claimed in claim 1, wherein said phase rotation unit is constructed to include a difference frequency/phase generator for outputting phase information by using information regarding said difference frequency, a second cosine/sine information storage unit for receiving said phase information from said difference frequency/phase generator and outputting digital cosine/sine information equivalent to said phase information and a phase rotation execution unit for executing phase rotation for said first and second baseband digital signals by using said digital cosine/sine information from said second cosine/sine information storage unit.

7. A digital modulation apparatus as claimed in claim 6, wherein said difference frequency/phase generator is constructed to include a difference frequency generator for generating said difference frequency and a counter for receiving an output of said difference frequency generator and outputting said phase information.

8. A digital modulation apparatus as claimed in claim 6, wherein said difference frequency/phase generator is constructed to include difference frequency setting means for setting said difference frequency and an accumulator having a multiplication unit and a buffer unit for temporarily storing an output of said multiplication unit for multiplying information regarding said difference frequency by an output from said buffer unit and outputting information stored in said buffer unit.

9. A digital modulation apparatus as claimed in claim 1, wherein in an input side of said phase rotation unit, an oversampling unit is provided for performing oversampling for said first and second baseband digital signals respectively.

10. A digital modulation apparatus as claimed in claim 9, wherein said oversampling unit is constructed to include an FIR filter.

11. A digital modulation apparatus as claimed in claim 9, wherein said oversampling unit is constructed to include a linear interpolation circuit.

12. A digital modulation apparatus comprising:
a first quadrature amplitude modulation unit for modulating first and second baseband digital signals orthogonal to each other by means of digital cosine/sine information obtained based on information regarding a carrier frequency which is n multiple (n is an integer $\geq 2$) of a local frequency;
a second quadrature amplitude modulation unit for modulating said first and second baseband digital signals by means of digital cosine/sine information different in phase by 90° from said digital cosine/sine information used in said first quadrature amplitude modulation unit;
a difference frequency/phase generator for outputting phase information by using information regarding a difference frequency equivalent to a difference between said local frequency and a baseband frequency;
a third cosine/sine information storage unit for receiving said phase information from said difference frequency/phase generator and outputting digital cosine/sine information equivalent to said phase information; and
an operation unit for multiplying said digital cosine information from said third cosine/sine information storage unit by an output of said first quadrature amplitude modulation unit, multiplying said digital sine information from said third cosine/sine information storage unit by an output of said second quadrature amplitude modulation unit and adding together both of these multiplying results.

13. A digital modulation apparatus as claimed in claim 12, wherein said first quadrature amplitude modulation unit is constructed to include a carrier frequency/phase generator for outputting said phase information by using information regarding said carrier frequency, a phase adjustment unit for branching said first and second baseband digital signals respectively into required numbers and performing phase rotation for said branched first and second baseband digital signals respectively and a first selector unit for sequentially selecting and outputting said first and second baseband digital signals and said phase-rotated first and second baseband digital signals from said phase rotation unit by using said phase information from said carrier frequency/phase generator as switching information, and said second quadrature amplitude modulation unit shares said carrier frequency/phase generator and said phase adjustment unit with said first quadrature amplitude modulation unit and is constructed to include a second selector unit for sequentially selecting and outputting said first and second baseband digital signals and said phase-rotated first and second baseband digital signals from said phase adjustment unit by using said phase information from said carrier frequency/phase generator as switching information and in phases different by 90° from selected phases for said first selector unit.

14. A digital modulation apparatus as claimed in claim 13, wherein said carrier frequency/phase generator is constructed to include a frequency generator for generating said carrier frequency and a counter for receiving an output of said frequency generator and outputting said phase information.

15. A digital modulation apparatus as claimed in claim 12, wherein said difference frequency/phase generator is constructed to include a frequency generator for generating said difference frequency and a counter for receiving an output of said frequency generator and outputting said phase information.

16. A digital modulation apparatus as claimed in claim 12, wherein said difference frequency/phase generator is constructed to include difference frequency setting means for setting said difference frequency and an accumulator having a multiplication unit and a buffer unit for temporarily storing an output of said multiplication unit for multiplying information regarding said difference frequency by an output from said buffer unit in said multiplication unit and outputting information stored in said buffer unit.

17. A digital modulation apparatus as claimed in claim 12, wherein in input sides of said first and second quadrature amplitude modulation units, oversampling units are provided for performing oversampling for said first and second baseband digital signals respectively.

18. A digital modulation apparatus as claimed in claim 17, wherein said oversampling units are constructed to include FIR filters.

19. A digital modulation apparatus as claimed in claim 17, wherein said oversampling units are constructed to include linear interpolation circuits.

* * * * *